US012468247B2

(12) United States Patent
Ota

(10) Patent No.: US 12,468,247 B2
(45) Date of Patent: Nov. 11, 2025

(54) FIXING DEVICE CONFIGURED TO DETERMINE WHETHER THERE IS AN ABNORMALITY BASED ON ESTIMATED TEMPERATURE VALUES

(71) Applicant: Toshiba Tec Kabushiki Kaisha, Tokyo (JP)

(72) Inventor: Hiroshi Ota, Ota Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 41 days.

(21) Appl. No.: 18/464,889

(22) Filed: Sep. 11, 2023

(65) Prior Publication Data

US 2025/0085653 A1 Mar. 13, 2025

(51) Int. Cl.
*G03G 15/20* (2006.01)

(52) U.S. Cl.
CPC ..... *G03G 15/2064* (2013.01); *G03G 15/2039* (2013.01); *G03G 15/205* (2013.01); *G03G 2215/2035* (2013.01)

(58) Field of Classification Search
CPC ............. G03G 15/2039; G03G 15/205; G03G 15/2064; G03G 2215/2035
See application file for complete search history.

(56) References Cited

U.S. PATENT DOCUMENTS

2003/0118363 A1* 6/2003 Izawa ................ G03G 15/2064 399/328
2015/0168889 A1* 6/2015 Kita ................... G03G 15/2039 399/33
2021/0081733 A1 3/2021 Hitaka

FOREIGN PATENT DOCUMENTS

JP 2002023550 A 1/2002
JP 2014034178 A 2/2014
JP 2015158634 A 9/2015
JP 2020020937 A 2/2020
JP 2022034347 A 3/2022

* cited by examiner

*Primary Examiner* — Joseph S Wong
(74) *Attorney, Agent, or Firm* — Kim & Stewart LLP

(57) ABSTRACT

According to one embodiment, a fixing device includes a fuser including a fixing member with a surface to contact a printable medium and a heat source for heating the fixing member. A temperature sensor is provided having a sensing part that contacts the surface of the fixing member. A heater control circuit is configured to estimate a temperature of the surface of the fixing member based on a temperature measured by the sensing part of the temperature sensor. A memory is provided for storing estimated temperature values obtained over a prior time period by the heater control circuit. A controller is configured to determine whether there is an abnormality in the fixing device based on a difference between a maximum value and a minimum value of the estimated temperature values stored in the memory.

10 Claims, 15 Drawing Sheets

FIG. 5

| CENTER | INPUT VOLTAGE (V) | | |
|---|---|---|---|
| | −10% | 100/120/230 | +10% |
| 100V_A | 195.1 | 172.9 | 159.7 |
| 100V_B | 179.5 | 166.6 | 145.1 |
| 230V | 174.4 | 149.0 | 128.7 |
| 120V | 182.3 | 167.0 | 149.5 |
| MIN | 174.4 | 149.0 | 128.7 |
| MAX | 195.1 | 172.9 | 159.7 |
| MAX−MIN | 20.7 | 23.9 | 31.0 |
| MIN UNDER ALL CONDITIONS | 128.7 | | |
| MAX UNDER ALL CONDITIONS | 195.1 | | |
| MAX-MIN UNDER ALL CONDITIONS | 66.4 | | |

FIG. 6

| SIDE | INPUT VOLTAGE (V) | | |
|---|---|---|---|
| | −10% | 100/120/230 | +10% |
| 100V_A | 207.8 | 183.6 | 168.1 |
| 100V_B | 202.4 | 183.7 | 164.7 |
| 230V | 197.7 | 171.4 | 149.2 |
| 120V | 198.3 | 187.0 | 165.7 |
| MIN | 197.7 | 171.4 | 149.2 |
| MAX | 207.8 | 187.0 | 168.1 |
| MAX−MIN | 10.1 | 15.6 | 18.9 |
| MIN UNDER ALL CONDITIONS | 149.2 | | |
| MAX UNDER ALL CONDITIONS | 207.8 | | |
| MAX-MIN UNDER ALL CONDITIONS | 58.6 | | |

FIG 7

| CENTER | INPUT VOLTAGE (V) | | |
|---|---|---|---|
| | -10% | 100 | +10% |
| 100V_C WITH 0.21 mm | 204.2 | 186.4 | 175.0 |
| 100V_S WITH 0.21 mm | 176.0 | 162.7 | 141.5 |
| 100V_C AND S WITH 0.21 mm | 196.1 | 183.0 | 166.2 |
| MIN | 176.0 | 162.7 | 141.5 |
| MAX | 204.2 | 186.4 | 175.0 |
| MAX-MIN | 28.2 | 23.7 | 33.5 |
| MIN UNDER ALL CONDITIONS | 141.5 | | |
| MAX UNDER ALL CONDITIONS | 204.2 | | |
| MAX-MIN UNDER ALL CONDITIONS | 62.7 | | |

FIG 8

| SIDE | INPUT VOLTAGE (V) | | |
|---|---|---|---|
| | -10% | 100 | +10% |
| 100V_C WITH 0.21 mm | 190.7 | 164.9 | 147.5 |
| 100V_S WITH 0.21 mm | 228.6 | 209.6 | 188.1 |
| 100V_C AND S WITH 0.21 mm | 211.2 | 195.5 | 175.6 |
| MIN | 190.7 | 164.9 | 147.5 |
| MAX | 228.6 | 209.6 | 188.1 |
| MAX-MIN | 37.9 | 44.7 | 40.6 |
| MIN UNDER ALL CONDITIONS | 147.5 | | |
| MAX UNDER ALL CONDITIONS | 228.6 | | |
| MAX-MIN UNDER ALL CONDITIONS | 81.1 | | |

FIG. 9

| CENTER | INPUT VOLTAGE (V) | | |
|---|---|---|---|
| | -10% | 100/120/230 | +10% |
| 100V_A_C WITH 0.42 mm | 225.7 | 203.5 | 187.1 |
| 100V_A_S WITH 0.42 mm | 157.3 | 150.0 | 136.5 |
| 100V_A_C AND S WITH 0.42 mm | 204.2 | 188.7 | 177.3 |
| 100V_B_C WITH 0.42 mm | 214.9 | 193.1 | 176.3 |
| 100V_B_S WITH 0.42 mm | 172.9 | 142.7 | 120.6 |
| 100V_B_C AND S WITH 0.42 mm | 191.9 | 173.0 | 160.8 |
| 230V_C WITH 0.42 mm | 208.3 | 181.8 | 169.6 |
| 230V_S WITH 0.42 mm | 149.0 | 129.9 | 106.8 |
| 230V_C AND S WITH 0.42 mm | 195.3 | 168.8 | 151.9 |
| 120V_C WITH 0.42 mm | 218.3 | 194.3 | 181.0 |
| 120V_S WITH 0.42 mm | 172.9 | 145.7 | 130.0 |
| 120V_C AND S WITH 0.42 mm | 195.9 | 181.5 | 170.6 |
| MIN | 149.0 | 129.9 | 106.8 |
| MAX | 225.7 | 203.5 | 187.1 |
| MAX-MIN | 76.7 | 73.6 | 80.3 |
| MIN UNDER ALL CONDITIONS | 106.8 | | |
| MAX UNDER ALL CONDITIONS | 225.7 | | |
| MAX-MIN UNDER ALL CONDITIONS | 118.9 | | |

FIG. 10

| SIDE | INPUT VOLTAGE (V) | | |
|---|---|---|---|
| | -10% | 100/120/230 | +10% |
| 100V_A_C WITH 0.42 mm | 172.4 | 152.3 | 127.5 |
| 100V_A_S WITH 0.42 mm | 244.7 | 220.7 | 208.0 |
| 100V_A_C AND S WITH 0.42 mm | 214.6 | 196.0 | 182.8 |
| 100V_B_C WITH 0.42 mm | 162.9 | 133.8 | 132.4 |
| 100V_B_S WITH 0.42 mm | 233.7 | 216.9 | 202.2 |
| 100V_B_C AND S WITH 0.42 mm | 212.7 | 194.1 | 183.6 |
| 230V_C WITH 0.42 mm | 163.4 | 140.9 | 114.0 |
| 230V_S WITH 0.42 mm | 234.6 | 210.8 | 190.6 |
| 230V_C AND S WITH 0.42 mm | 208.6 | 194.3 | 171.0 |
| 120V_C WITH 0.42 mm | 167.5 | 148.4 | 131.3 |
| 120V_S WITH 0.42 mm | 231.5 | 221.6 | 206.6 |
| 120V_C AND S WITH 0.42 mm | 218.3 | 198.2 | 185.3 |
| MIN | 162.9 | 133.8 | 114.0 |
| MAX | 244.7 | 221.6 | 208.0 |
| MAX-MIN | 81.8 | 87.8 | 94.0 |
| MIN UNDER ALL CONDITIONS | 114.0 | | |
| MAX UNDER ALL CONDITIONS | 244.7 | | |
| MAX-MIN UNDER ALL CONDITIONS | 130.7 | | |

FIG. 11

| | CENTER | SIDE | SENSOR STATE | VOLTAGE VARIATION | ACTUAL TEMPERATURE RISE |
|---|---|---|---|---|---|
| | ct≦31.0 | st≦18.9 | NORMAL | ALMOST NONE | NORMAL |
| | 31.0<ct≦66.4 | 18.9<st≦58.6 | NORMAL | WITHIN ±10% | |
| CONTAMINATION 0.21 mm | 23.7≦ct≦62.7 | 37.9≦st≦81.1 | SENSOR ABNORMAL | WITHIN ±10% | C:7.2~13.9°C S:6.4~11.5°C |
| CONTAMINATION 0.42 mm | 73.6≦ct≦118.9 | 81.8≦st≦130.7 | SENSOR ABNORMAL | WITHIN ±10% | C:23.0~32.2°C S:18.5~25.4°C |

FIG. 12

| CENTER | SENSOR STATE | VOLTAGE VARIATION | ACTUAL TEMPERATURE RISE |
|---|---|---|---|
| ct≦23.8 | NORMAL | ALMOST NONE | NORMAL |
| 23.8<ct≦62.7 | THERE IS POSSIBILITY THAT SENSOR IS ABNORMAL | WITHIN ±10% | THERE IS POSSIBILITY OF C:7.2 TO 13.9°C |
| 62.7<ct≦118.9 | SENSOR ABNORMAL | WITHIN ±10% | C:23.0~32.2°C |
| 118.9<ct | SENSOR ABNORMAL | ±10% OR MORE | C:23.0 TO 32.2°C OR MORE |

FIG. 13

| SIDE | SENSOR STATE | VOLTAGE VARIATION | ACTUAL TEMPERATURE RISE |
|---|---|---|---|
| st≦18.9 | NORMAL | ALMOST NONE | NORMAL |
| 18.9<st≦37.9 | NORMAL | WITHIN ±10% | NORMAL |
| 37.9<st≦81.1 | SENSOR ABNORMAL | WITHIN ±10% | S:6.4~11.5°C |
| 81.1<st≦130.7 | SENSOR ABNORMAL | WITHIN ±10% | S:18.5~25.4°C |
| 130.7<st | SENSOR ABNORMAL | ±10% OR MORE | S: 18.5 TO 25.4°C OR MORE |

FIXING DEVICE CONFIGURED TO DETERMINE WHETHER THERE IS AN ABNORMALITY BASED ON ESTIMATED TEMPERATURE VALUES

FIELD

Embodiments described herein relate generally to a fixing device for use in an image forming apparatus or the like.

BACKGROUND

An image forming apparatus placed in a workplace or the like often includes a fixing device that fixes a toner image to a print medium by applying heat and pressure to the print medium. The fixing device includes a temperature sensor that detects a surface temperature of a fixing rotator (fixing member). The fixing device controls the surface temperature of the fixing rotator to be a target value based on the detected signal from the temperature sensor.

However, in some instances, the temperature sensor may not be able to accurately sense the temperature due contaminant attachment or the like. Thus, there is a problem in that the controller will then control the surface temperature of the fixing rotator to be a temperature different from the intended target value since the temperature sensor cannot detect the correct temperature.

BRIEF DESCRIPTION OF THE DRAWINGS

FIG. 5 is a diagram illustrating an example of center WAE estimation values when a sensing part of a temperature sensor of a fixing device has no contamination.

FIG. 6 is a diagram illustrating an example of side WAE estimation values if a sensing part of a temperature sensor of a fixing device has no contamination.

FIG. 7 is a diagram illustrating an example of center WAE estimation values if a sensing part of a temperature sensor of a fixing device has a contaminant level of 0.21 mm.

FIG. 8 is a diagram illustrating an example of side WAE estimation values if a sensing part of a temperature sensor of a fixing device has a contaminant level of 0.21 mm.

FIG. 9 is a diagram illustrating an example of center WAE estimation values if a sensing part of a temperature sensor of a fixing device has a contaminant level of 0.42 mm.

FIG. 10 is a diagram illustrating an example of side WAE estimation values if a sensing part of a temperature sensor of a fixing device has a contaminant level of 0.42 mm.

FIG. 11 is a diagram illustrating an example of state estimation with respect to a difference between maximum value and minimum value of WAE estimation according to contamination of a sensing part of a temperature sensor of a fixing device.

FIG. 12 is a diagram illustrating an example of state estimation with respect to a difference between maximum value and minimum value of center WAE estimation in a fixing device.

FIG. 13 is a diagram illustrating an example of state estimation according to the difference between maximum value and minimum value of side WAE estimation in a fixing device.

DETAILED DESCRIPTION

In general, according to one embodiment, a fixing device includes a fuser including a fixing member with a surface to contact a printable medium and a heat source for heating the fixing member. A temperature sensor is provided having a sensing part that contacts the surface of the fixing member. A heater control circuit is configured to estimate a temperature of the surface of the fixing member based on a temperature measured by the sensing part of the temperature sensor. A memory is provided for storing estimated temperature values obtained over a prior time period by the heater control circuit. A controller is configured to determine whether there is an abnormality in the fixing device based on a difference between a maximum value and a minimum value in the estimated temperature values stored in the memory.

An image forming apparatus according to certain example embodiments will be described below with reference to the drawings.

Figure 1:
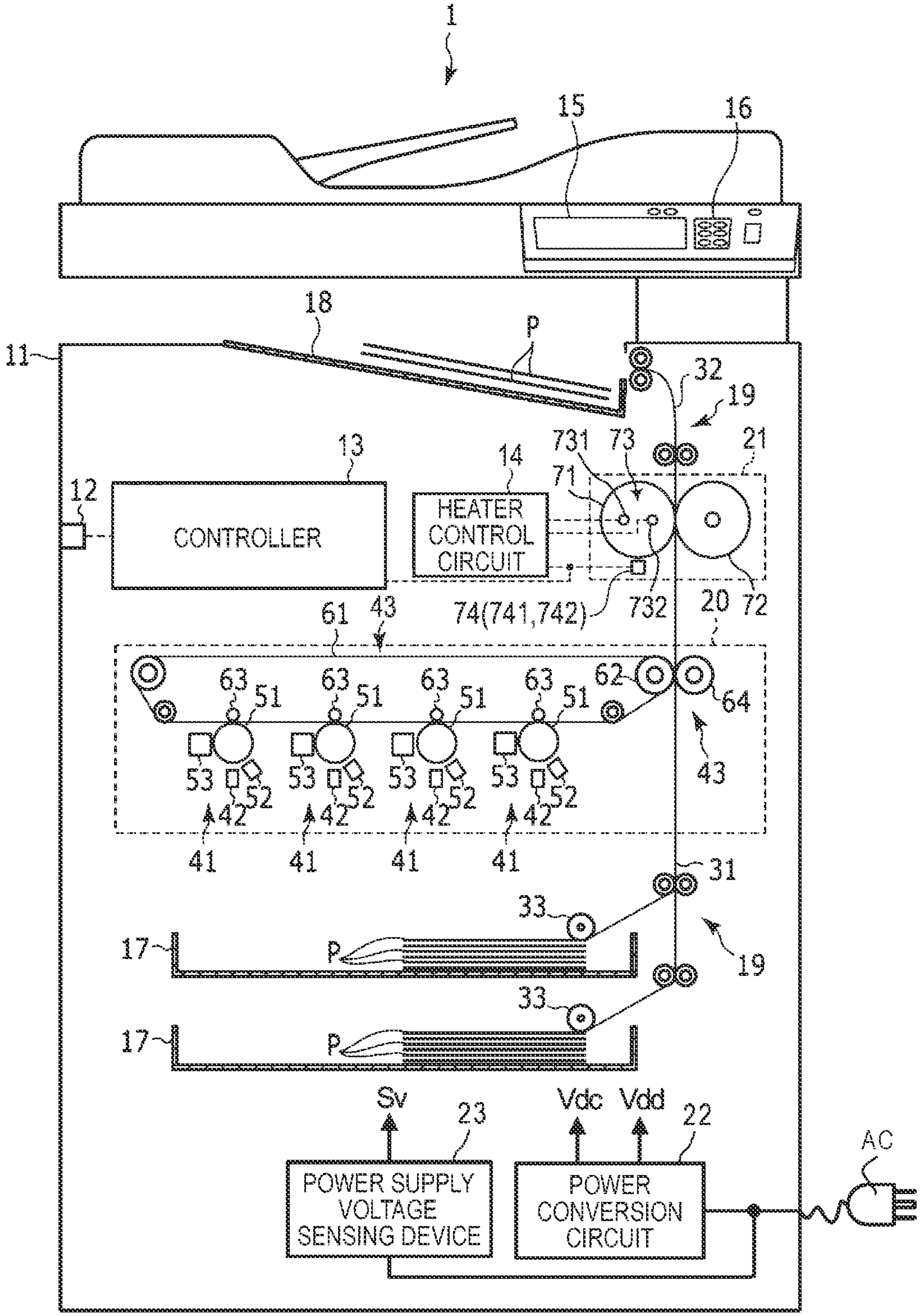
FIG. 1 is a diagram illustrating an image forming apparatus including a fixing device according to an embodiment.

FIG. 1 is a diagram for explaining a configuration example of an image forming apparatus 1 including a fixing device according to an embodiment.

The image forming apparatus 1 is a multifunction peripheral (MFP) that performs various processes such as image forming while conveying a recording medium (e.g., a sheet of paper or any printable medium). The image forming apparatus 1 transfers a toner image formed by electrophotography onto a sheet of paper, and fixes the toner image to the sheet with the fuser.

The image forming apparatus 1 receives toner from a toner cartridge and forms an image on the sheet with the toner. The toner may be a monochromatic toner, or may be a color toner having a color such as cyan, magenta, yellow, black, or the like. In some examples, the toner may be a decolorable toner that decolorizes when heat is applied.

As shown in FIG. 1, the image forming apparatus 1 includes a housing 11, a communication interface 12, a controller 13 (system controller), a heater control circuit 14, a display device 15, an operation device 16, a plurality of paper trays 17, a paper discharge tray 18, a conveyance mechanism 19, an image forming mechanism 20, a fuser 21, a power conversion circuit 22, and a power supply voltage sensing device 23.

The housing 11 is a main body of the image forming apparatus 1. The housing 11 houses the communication interface 12, the controller 13, the heater control circuit 14, the display device 15, the operation device 16, the plurality of paper trays 17, the paper discharge tray 18, the conveyance mechanism 19, the image forming mechanism 20, the fuser 21, the power conversion circuit 22, and the power supply voltage sensing device 23.

The communication interface 12 is for communicating with other devices connected via a network. The communication interface 12 is used for communication with an external device. The external device can be a user terminal that instructs to perform a print job, or a server (external management device) for device management or the like. For example, the communication interface 12 is configured by a LAN connector or the like. The communication interface 12 may perform wireless communication with other devices according to a standard such as Bluetooth®, Wi-fi, or the like.

The controller 13 (system controller) controls each unit of the image forming apparatus 1 and executes data processing and the like. For example, the controller 13 can be a computer including a processor, a memory, and various interfaces. The controller 13 controls each unit or subcomponent of the image forming apparatus 1 and executes data processing by the processor executing a program stored in the memory. The controller 13 is connected to each unit in the housing 11 through various internal interfaces.

The controller 13 generates a print job based on image data or the like that may be received from an external device via the communication interface 12. The image data included in the print job is data representing the image to be formed on a print medium P. The image data may be data for forming an image on one print medium P or a plurality of print media P. The print job may include information indicating printing settings such as information indicating whether the printing will be a color printing or a monochrome printing.

The controller 13 includes an engine controller that controls operations of the conveyance mechanism 19, the image forming mechanism 20, and the fuser 21. For example, the controller 13 controls the conveyance of the print medium P by the conveyance mechanism 19. The controller 13 controls the formation of a developer image and the transfer of the developer image to the print medium P by the image forming mechanism 20. The controller 13 controls fixing of the developer image to the print medium P by the fuser 21. The controller 13 forms an image on the print medium P corresponding to the image data included in the print job by controlling the operations of the conveyance mechanism 19, the image forming mechanism 20 and the fuser 21.

In some examples, the image forming apparatus 1 may have an engine controller separate from the controller 13. For example, the image forming apparatus 1 may include an engine controller separately from the controller 13, which then controls at least one of the conveyance mechanism 19, the image forming mechanism 20, the fuser 21, and the like. An engine controller provided separately from the controller 13 may acquire information necessary for control from the controller 13 as well as be under the overall control of the controller 13.

The heater control circuit 14 is a temperature control device that controls energization of heaters 73 provided in the fuser 21 under the control of the controller 13. In this example, the heaters 73 include a center heater 731 and a side heater 732. The heater control circuit 14 generates energizing powers PC1 and PC2 for the heaters 73. The heater control circuit 14 supplies the energizing power PC1 to the center heater 731 and the energizing power PC2 to the side heater 732.

The display device 15 includes a display that displays an image in response to an image signal input from the controller 13 or from a display control unit such as a graphics controller. For example, the display device 15 displays, on the display, a setting screen for setting various settings (operating parameters) of the image forming apparatus 1.

The operation device 16 (input device) supplies an operation signal to the controller 13 according to the user operations (inputs) made using the operation device 16. For example, the operation device 16 can be one or more of a touch sensor, a numeric keypad, a power key, various function keys, a keyboard, or the like. A touch sensor functioning as the operation device 16 acquires information indicating a designated position in a certain region of a display screen or the like. The touch sensor may be integrated with the display device 15 as a touch panel. Note that the display device 15 and the operation device 16 may be provided on an operation panel as a user interface of the image forming apparatus 1.

The power conversion circuit 22 supplies a DC voltage to each unit in the image forming apparatus 1. The DC voltage(s) are provided using an alternating current (AC) voltage from a power supply AC such as an external power supply. For example, the power conversion circuit 22 generates DC voltages Vdd and Vdc from an AC voltage from the power supply AC. The power conversion circuit 22 supplies the DC voltage Vdd to the controller 13 and the DC power supply voltage Vdc to the heater control circuit 14. The power conversion circuit 22 supplies the image forming mechanism 20 with the DC voltage(s) necessary for image forming. The power conversion circuit 22 supplies the conveyance mechanism 19 with the DC voltage necessary for the print medium P conveyance.

The power supply voltage sensing device 23 senses a voltage value of the AC voltage from the power supply AC, and outputs a power supply voltage sensing result Sv. The configuration of the power supply voltage sensing device 23 is not particularly limited. Any device may be used as long as the power supply voltage value can be sensed. The power supply voltage sensing device 23 may sense the voltage value of the DC power supply voltage Vdc after conversion by the power conversion circuit 22 instead of the voltage value of the AC voltage from the power supply AC before conversion. The power supply voltage sensing result Sv output by the power supply voltage sensing device 23 is input to the controller 13.

The controller 13 stores a power supply voltage value as indicated by the power supply voltage sensing result Sv. The controller 13 may transmit the power supply voltage value indicated by the power supply voltage sensing result Sv to a host computer via the network by the communication interface 12. The controller 13 may store transmission destination information such as a network address of the host computer in a non-volatile memory or the like. The controller 13 may transmit the power supply voltage value indicated by the power supply voltage sensing result Sv to another image forming apparatus connected via the network by the communication interface 12. The controller 13 may transmit the power supply voltage value indicated by the power supply voltage sensing result Sv to another image forming apparatus connected to the image forming apparatus 1 via another interface.

Next, the configuration of a conveyance system in the image forming apparatus 1 will be described.

Each of the paper trays 17 is a cassette that houses print media P. The paper tray 17 is configured to be able to receive the print medium P from the outside of the housing 11. For example, the paper tray 17 is configured to be pulled out from the housing 11, loaded with print media P, then returned to the inside of the housing 11.

The paper discharge tray 18 is a tray that supports the print medium P after being discharged from the image forming apparatus 1.

The conveyance mechanism 19 is for conveying the print medium P inside the image forming apparatus 1. As illustrated in FIG. 1, the conveyance mechanism 19 includes a plurality of conveyance paths. For example, the conveyance mechanism 19 includes a paper feed conveyance path 31 and a paper discharge conveyance path 32.

The paper feed conveyance path 31 and the paper discharge conveyance path 32 are each formed of a plurality of motors, rollers, and guides. The motors rotate shafts under the control of the controller 13 to rotate the rollers. As the rollers are rotated, the print medium P is moved along a conveyance path. The guides help directionally control the conveyance of the print medium P along the conveyance path.

The paper feed conveyance path 31 picks up the print medium P from the paper tray 17, and supplies the print medium P to the image forming mechanism 20. The paper feed conveyance path 31 includes a pickup roller 33 corresponding to each paper tray. Each pickup roller 33 picks up a print medium P of a paper tray 17 then moves the print medium P into the paper feed conveyance path 31.

The paper discharge conveyance path 32 is a conveyance path for discharging the print medium P on which an image has already been formed to the outside of the housing 11. The print medium P discharged by the paper discharge conveyance path 32 rests on the paper discharge tray 18.

Next, the configuration of the image forming mechanism 20 in the image forming apparatus 1 will be described.

The image forming mechanism 20 forms an image on the print medium P. The image forming mechanism 20 forms an image on the print medium P based on the print job generated by the controller 13.

The image forming mechanism 20 includes a plurality of process units 41 (image forming stations), a plurality of exposure devices 42, and a transfer mechanism 43. The image forming mechanism 20 in this example includes an exposure device 42 for each process unit 41. Since the plurality of process units 41 and the plurality of exposure devices 42 may each have the same configuration, one process unit 41 and one exposure device 42 will be described as representative.

First, the process unit 41 will be described.

The process unit 41 forms a toner image. For example, a separate process unit 41 is provided for each type of toner available in the image forming mechanism 20. For example, the plurality of process units 41 correspond to different color toners such as cyan, magenta, yellow, black, or the like. Specifically, a toner cartridge of a single color is connected to each process unit 41.

The toner cartridge includes a toner container (reservoir) and a toner delivery mechanism. The toner container contains fresh toner or the like therein. The toner delivery mechanism can be a screw mechanism or the like that delivers toner from the toner container to a developing unit 53.

The process unit 41 includes a photoreceptor drum 51, a charger 52, a developing unit 53, and the like.

The photoreceptor drum 51 is a photosensitive member including a cylindrical drum and a photosensitive layer formed on an outer peripheral surface of the drum. The photoreceptor drum 51 is rotated at a constant speed by a drive mechanism.

The electrostatic charger 52 uniformly charges the surface of the photoreceptor drum 51. For example, the electrostatic charger 52 applies a voltage (development bias voltage) to the photoreceptor drum 51 using an electrostatic roller to charge the photoreceptor drum 51 to a uniform negative electrode potential (contrast potential). The electrostatic roller is rotated by the rotation of the photoreceptor drum 51 while a predetermined pressure is applied to the photoreceptor drum 51.

The developing unit 53 is a device for adhering the toner onto the outer peripheral surface of the photoreceptor drum 51. The developing unit 53 includes a developer container, an agitating mechanism, a developing roller, a doctor blade, an auto toner control (ATC) sensor, and the like.

The developer container receives and stores the toner delivered from the toner cartridge. A carrier (carrier particles) is stored inside the developer container. The toner delivered from the toner cartridge is agitated (mixed) with the carrier by the agitating mechanism and thus forms developer in which the toner and the carrier are mixed. The carrier can be placed in the developer container when the developing unit 53 is initially manufactured.

The developing roller is rotated in the developer container to attach developer onto the surface of the roller. A doctor blade is a member disposed at a predetermined distance from the surface of the developing roller. The doctor blade removes an excess portion of the developer adhered onto the surface of the rotating developing roller. As a result, a developer layer having a thickness corresponding to the distance between the doctor blade and the surface of the developing roller is formed on the surface of the developing roller.

The ATC sensor can be a magnetic flux sensor that includes a coil and detects a voltage value generated in the coil. The detected voltage of the ATC sensor changes according to the density (amount) of the toner in the developer container. That is, based on the detected voltage of the ATC sensor, the controller 13 determines a concentration ratio (toner concentration ratio) of the toner to the carrier presently in the developer container. The controller 13 operates a motor that drives the toner cartridge delivery mechanism based on the detected toner concentration ratio to deliver additional toner from the toner cartridge to the developer container of the developing unit 53 as necessary.

Next, the configuration of the exposure device 42 will be described.

The exposure device 42 includes a plurality of light emitting elements. The exposure device 42 irradiates the charged photoreceptor drum 51 with light from the light emitting elements to form a latent image on the photoreceptor drum 51. For example, the light emitting elements are light emitting diodes (LEDs) or the like. One light emitting element is configured to irradiate one point on the photoreceptor drum 51 with light. The plurality of light emitting elements are arranged along a main scanning direction, which is a direction parallel to the rotation axis of the photoreceptor drum 51.

The exposure device 42 irradiates the photoreceptor drum 51 with light from the plurality of light emitting elements to form a latent image for one image line (e.g., on row of pixels/dots) on the photoreceptor drum 51. The exposure device 42 continuously irradiates the rotating photoreceptor drum 51 with light to form the plurality of lines of a latent image corresponding to the image to be printed.

When the surface of the photoreceptor drum 51 charged by the electrostatic charger 52 is irradiated with the light from the exposure device 42, an electrostatic latent image is formed by the unexposed and exposed portions of the outer surface of the photoreceptor drum 51. When the layer of the developer formed on the surface of the developing roller approaches this surface of the photoreceptor drum 51, the toner contained in the developer becomes adhered onto the latent image formed on the surface of the photoreceptor drum 51. As a result, a toner image is formed on the surface of the photoreceptor drum 51.

Next, the configuration of the transfer mechanism 43 will be described.

The transfer mechanism 43 is configured to transfer the toner image on the surface of the photoreceptor drum 51 to the print medium P. Initially, the toner image formed on the surface of the photoreceptor drum 51 is first transferred to a primary transfer belt 61 and then from the primary transfer belt 61 to the print medium P.

For example, the transfer mechanism 43 includes the primary transfer belt 61, a secondary transfer facing roller 62, a plurality of primary transfer rollers 63, and a secondary transfer roller 64.

In the configuration example shown in FIG. 1, the primary transfer belt 61 is an endless belt wound around the secondary transfer facing roller 62 and a plurality of winding rollers. An inner surface (inner peripheral surface) of the primary transfer belt 61 is in contact with the secondary transfer facing roller 62 and the plurality of winding rollers, and an outer surface (outer peripheral surface) of the primary transfer belt 61 faces the photoreceptor drum 51 of the process unit 41.

The secondary transfer facing roller 62 is rotated by a motor. The secondary transfer facing roller 62 rotates to convey the primary transfer belt 61 in a predetermined conveying direction. The plurality of winding rollers are configured to be freely rotatable. The winding rollers are rotated according to the movement of the primary transfer belt 61 by the secondary transfer facing roller 62.

The primary transfer rollers 63 are configured to bring the primary transfer belt 61 into contact with the photoreceptor drum 51 of each process unit 41. The plurality of primary transfer rollers 63 are provided to correspond to the photoreceptor drums 51 of the plurality of process units 41. Specifically, the primary transfer rollers 63 are provided at positions (primary transfer positions) facing the photoreceptor drums 51 of the corresponding process units 41 with the primary transfer belt 61 interposed therebetween. The primary transfer roller 63 comes into contact with the inner peripheral surface side of the primary transfer belt 61 and displaces the primary transfer belt 61 toward the photoreceptor drum 51. As a result, the primary transfer roller 63 brings the outer peripheral surface of the primary transfer belt 61 into contact with the photoreceptor drum 51.

The secondary transfer roller 64 is provided at a position (secondary transfer position) facing the primary transfer belt 61. The secondary transfer roller 64 contacts the outer peripheral surface of the primary transfer belt 61 and applies pressure thereto. As a result, a transfer nip is formed where the secondary transfer roller 64 and the outer peripheral surface of the primary transfer belt 61 are in close contact with each other. When the print medium P passes through the transfer nip, the secondary transfer roller 64 presses the print medium P passing through the transfer nip against the outer peripheral surface of the primary transfer belt 61.

The secondary transfer roller 64 and the secondary transfer facing roller 62 are rotated to convey the print medium P while holding the print medium P therebetween. As a result, the print medium P passes through the transfer nip.

In the above configuration, when the outer peripheral surface of the primary transfer belt 61 comes into contact with the photoreceptor drum 51, the toner image formed on the surface of the photoreceptor drum is transferred onto the outer peripheral surface of the primary transfer belt 61. If the image forming mechanism 20 includes the plurality of process units 41, the primary transfer belt 61 receives toner images from each of the photoreceptor drums 51 of the plurality of process units 41. The toner image transferred onto the outer peripheral surface of the primary transfer belt 61 is conveyed by the primary transfer belt 61 to the transfer nip where the secondary transfer roller 64 and the outer peripheral surface of the primary transfer belt 61 are in close contact with each other. When the print medium P is in the transfer nip, the toner image transferred onto the outer peripheral surface of the primary transfer belt 61 is transferred onto the print medium P at the transfer nip.

Next, the configuration of the fuser 21 in the image forming apparatus 1 will be described.

After the toner image is transferred onto the print medium P, the fuser 21 fixes the toner image to the print medium P. The fuser 21 operates under the control of the controller 13. It is assumed that a fixing device according to an embodiment is a device including the fuser 21, the heater control circuit 14, and the controller 13. The fuser 21 includes a fixing rotator as a fixing member, a pressure member, a heating member (heater or heat source), and a temperature sensor. Various configurations are possible for a fuser of a fixing device according to an embodiment. FIG. 1 shows a first configuration example of the fuser 21.

In the first configuration example shown in FIG. 1, the fuser 21 includes a heat roller 71, a press roller 72, a heater 73, a temperature sensor 74, and the like. The heat roller 71 is an example of a fixing rotator (fixing member). The press roller 72 is an example of a pressure member. The heater 73 is an example of a heating member (heat source). The fuser 21 of the first configuration example includes a heater 73 having a plurality of individual heat sources, which may each be referred to as heaters or heating elements. In the first configuration example, the heater 73 includes a center heater 731 (as an example of a first heat source) and a side heater 732 (as an example of a second heat source).

The temperature sensor 74 detects the surface temperature of the heat roller 71. The fuser 21 in this example, the temperature sensor 74 comprises a plurality of individual temperature sensors, which each includes a contact portion that contacts the surface of the heat roller 71 and senses the temperature of the surface portion contacting the contact portion. In the first configuration example, the temperature sensor 74 includes a center temperature sensor 741 and a side temperature sensor 742. The center temperature sensor 741 includes a contact portion that contacts the central region of the surface of the heat roller 71. The side temperature sensor 742 includes a contact portion that contacts a side (end) region on the surface of the heat roller 71.

Figure 2:
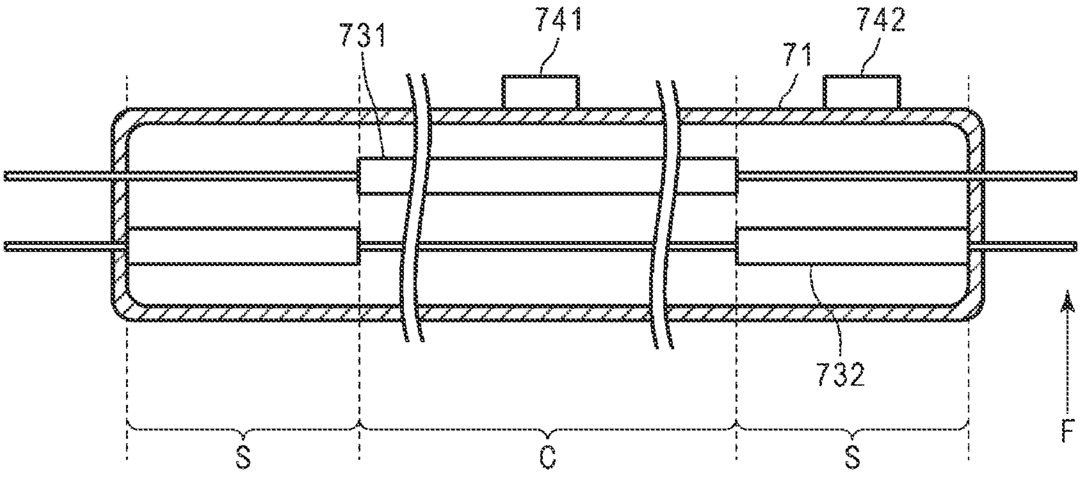
FIG. 2 is a diagram illustrating a first configuration example of a fuser in a fixing device.

FIG. 2 is a cross-sectional view showing a configuration example around the heat roller 71 in the fuser 21 of the first configuration example shown in FIG. 1.

The heat roller 71 is a fixing rotator that is rotated while being heated by the heater 73. The heat roller 71 includes a core metal structure formed of hollow metal cylinder or the like and an elastic layer formed on the outer periphery of the core metal structure.

For example, the diameter of the heat roller 71 is φ30 mm. For example, the core metal structure is made of aluminum with a thickness of 0.6 mm. For example, the peripheral speed of the heat roller 71 is 210 mm/s. For example, the elastic layer is made of fluororesin (e.g., tetrafluoroethylene resin). The diameter of the heat roller 71, the thickness of the core metal structure, the value of the peripheral speed, and the material type used for the core metal structure and the elastic layer described above are merely examples, and the present disclosure is not limited thereto.

In the heat roller 71, the inside of the core metal structure is heated by the heater 73 disposed inside the hollow core metal structure. The heat applied to the inside of the core metal structure is transferred to the outer surface of the heat roller 71 (the surface on which the elastic layer is disposed). Note, in some examples, the fixing rotator may be configured as an endless belt.

The press roller 72 is provided at a position facing the heat roller 71. The press roller 72 includes a core metal structure formed by a metal rod or the like with a predetermined outer diameter and an elastic layer formed on the outer circumference of the core metal. For example, the diameter of the press roller 72 is φ30 mm. For example, the elastic layer of the press roller 72 is made of silicon rubber or fluororubber.

The press roller 72 applies pressure to the heat roller 71 according to force applied from a tensioning member or the like. For example, the applied pressure is 150N. The values of the diameter and pressure of the press roller 72 and the types of materials used for these components are merely examples, and the present disclosure is not limited thereto. By applying pressure from the press roller 72 to the heat roller 71, a nip (fixing nip) is formed where the press roller 72 and the heat roller 71 are in close contact with each other. The press roller 72 is rotated by a motor. The press roller 72 rotates to move the print medium P through the fixing nip and presses the print medium P against the heat roller 71. Note that the heat roller 71 and the press roller 72 may each have a release layer on the outer surface thereof.

The heater 73 is formed of a plurality of heating elements that generate heat from the electric power supplied from the heater control circuit 14. The heater 73 in the fuser 21 of the first configuration example shown in FIGS. 1 and 2 includes the center heater 731 and the side heater 732 as heating elements. For example, the center heater 731 and the side heater 732 can be halogen lamp heaters each including halogen lamps.

The heater 73 in the fuser 21 is formed of two heaters, that is, the center heater 731 and the side heater 732. The center heater 731 heats the central portion (center region C) of the heat roller 71 along the rotation axis direction. The side heater 732 heats the side region S. The print medium P is conveyed in the conveying direction F shown in FIG. 2. The sizes of center region C and the side region S may be set according to the size of the medium being used as the print medium P.

The center heater 731 and the side heater 732 each generate heat from electric power supplied under the control of the controller 13. For example, the power consumption of the center heater 731 and the side heater 732 is 600 W.

In some examples, controller 13 heats just the center region C when performing a fixing onto a print medium P that is narrow in the rotation axis direction of the heat roller 71 (the conveying direction F of the print medium P). When just the center region C of the heat roller 71 is to be heated, the controller 13 causes the heater control circuit 14 to power just the center heater 731 without powering the side heater 732.

The controller 13 may heat the entire heat roller 71 (both the center region C and the side region S) when performing fixing on a print medium P that is wide in the rotation axis direction of the heat roller 71. When heating the entire heat roller 71, the controller 13 causes the heater control circuit 14 to power both the center heater 731 and the side heater 732.

The temperature sensors 741 and 742 each include contact portions (sensing parts) that contact the surface of the heat roller 71 and thus sense the local temperature of the portion in contact with the respective contact portion. For example, the temperature sensor 741 and the temperature sensor 742 are thermistors. The temperature sensors 741 and 742 are arranged parallel to the rotation axis of the heat roller 71. In the first configuration example shown in FIG. 2, the temperature sensor 741 senses the temperature of the center region C and is positioned at the middle of the center region C along the rotation axis direction (if the center portion is divided into three equal portions the contacting portion would be the middle portion of the three portions). The temperature sensor 742 senses the temperature of the side region S. In this example, each end (side) of the heat roller 71 beyond the center portion C is considered to be equivalent to the other and thus a single temperature sensor 742 can be used to control both ends of the heat roller 71. The temperature sensor 742 is generally positioned in the middle of the side region S on one end of the heat roller 71.

Each of the temperature sensors 741 and 742 includes a contact portion (sensing part) that contacts the surface of the heat roller 71. The temperature sensor 741 senses the temperature of the center region C by contacting the surface of the center region C of the heat roller 71 with the sensing part. The temperature sensor 742 senses the temperature of the side region S by contacting the surface of the side region S of the heat roller 71 with the sensing part.

Each of the temperature sensors 741 and 742 provides the controller 13 with a temperature detection result signal indicating a temperature detection result (sensed temperature value). When heating the center region C, the controller 13 operates the center heater 731 based on the temperature sensed by the temperature sensor 741. When heating the entire length of the heat roller 71, the controller 13 operates the center heater 731 and the side heater 732 based on the temperatures sensed by both the temperature sensors 741 and 742.

The heat roller 71 and the press roller 72 apply heat controlled within a predetermined temperature range and pressure to the print medium P passing through the fixing nip. The toner on the print medium P is fixed onto the surface of the print medium P by heat from the heat roller 71 and pressure from the heat roller 71 and the press roller 72. As a result, the toner image is fixed onto the print medium P passing through the fixing nip. The print medium P passed through the fixing nip is then introduced into the paper discharge conveyance path 32 and discharged to the outside of the housing 11.

Figure 3:
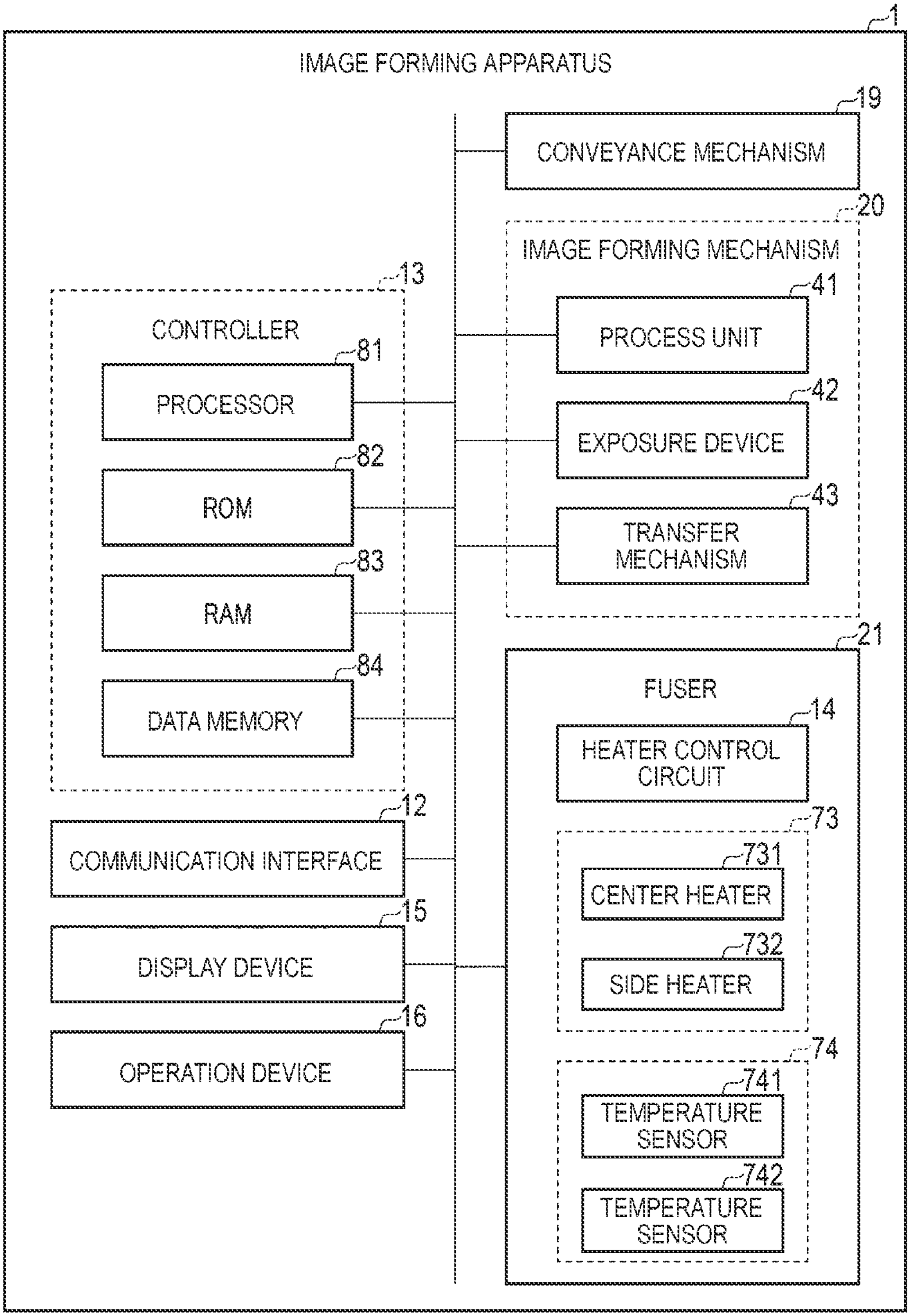
FIG. 3 is a block diagram of a control system in an image forming apparatus including a fixing device.

Next, the configuration of the control system in the image forming apparatus 1 will be described. FIG. 3 is a block diagram showing a configuration example of a control system in the image forming apparatus 1.

As shown in FIG. 3, the image forming apparatus 1 connects the communication interface 12, the heater control circuit 14, the display device 15, the operation device 16, the conveyance mechanism 19, the image forming mechanism 20, the fuser 21, and the like to the controller 13 (system controller).

The controller 13 includes a processor 81, a read only memory (ROM) 82, a random access memory (RAM) 83, and a data memory 84. The controller 13 can be a computer incorporating the processor 81, the ROM 82, the RAM 83, and the data memory 84. The controller 13 may be or include an ASIC (application specific integrated circuit) or the like.

The processor 81 controls each unit of the image forming apparatus 1 according to an operating system and/or application program. The processor 81 in this example is a central processing unit (CPU). Other processor types may be used and/or incorporated in the controller 13.

The ROM 82 is a non-volatile memory area, and the RAM 83 is a volatile memory area. The ROM 82 stores the operating system and, in some example, application programs. The ROM 82 stores control data necessary for the processor 81 to execute processes for controlling each unit. The RAM 83 is also used as a work area where data can be appropriately rewritten by the processor 81. The RAM 83 has a work area for storing image data, for example.

The data memory 84 is formed of a rewritable nonvolatile memory. The data memory 84 corresponds to an auxiliary memory portion of the controller 13. The data memory 84 can be configured as a storage device such as electric erasable programmable read-only memory (EEPROM), hard disk drive (HDD), solid state-drive (SSD), or the like. The data memory 84 stores data such as setting data for use by the processor 81 when performing various processes. The data memory 84 stores data generated by processes executed by the processor 81. The data memory 84 may store application programs.

The controller 13 controls the image forming mechanism 20. For example, the controller 13 controls each process unit 41, the exposure device 42, and the transfer mechanism 43. For example, the controller 13 controls on and off of charging of the charger 52 of each process unit 41. The controller 13 controls on and off of the exposure device 42 of each process unit 41 for irradiating the photoreceptor drum 51 with the laser light. Accordingly, an electrostatic latent image is formed on the photoreceptor drum 51.

The controller 13 controls on and off of the developing unit 53 of each process unit 41. As a result, the electrostatic latent image on the photoreceptor drum 51 is developed with the toner supplied from the developing unit 53 to form a toner image on the photoreceptor drum 51. The controller 13 controls a primary transfer bias at each primary transfer position for the transfer mechanism 43. The toner image on the photoreceptor drum 51 is transferred onto the primary transfer belt 61 at the primary transfer position. The controller 13 controls a secondary transfer bias at the secondary transfer position for the transfer mechanism 43. As a result, the toner image on the primary transfer belt 61 is transferred onto the print medium P.

The controller 13 controls the fixing device including the fuser 21. The controller 13 controls the operation of the center heater 731 and the side heater 732 using the heater control circuit 14 according to the sensing results from the temperature sensors 741 and 742. The heater control circuit 14 controls energization of the center heater 731 and the side heater 732 in response to control instructions from the controller 13. Note that some or all of the heater control circuit 14 may be incorporated in the controller 13.

The heater control circuit 14 controls energization (e.g., on/off and/or power levels, duty ratios, or the like) of the center heater 731 and the side heater 732, so that the surface of the heat roller 71 reaches a set target temperature. For example, the controller 13 sets a target temperature (control target) for the heater control circuit 14. The heater control circuit 14 supplies power to the center heater 731 while referring to the temperature sensed by the temperature sensor 741 such that the temperature of the center region C reaches the target value. The heater control circuit 14 supplies power to the side heater 732 while referring to the temperature sensed by the temperature sensor 742 such that the temperature of the side region S reaches the target value.

The heater control circuit 14 cuts off the power supply to the center heater 731 if the temperature of the center region C reaches a set center high stop temperature. The heater control circuit 14 cuts off the power supply to the side heater 732 if the temperature of the side region S reaches a set side high stop temperature. In the heater control circuit 14, the center high stop temperature and the side high stop temperature are set and corrected by the controller 13.

Next, control of the heater 73 of the fuser 21 in the image forming apparatus 1 will be described.

The image forming apparatus 1 controls the heater 73 of the fuser 21 by weighted average control with estimate temperature (WAE) control. The WAE control is performed based on the assumption that heat transfer in the fuser 21 can be equivalently represented by a RC (resistance-capacitance) time constant of an electric circuit. In the WAE control, a circuit (referred to in this context as a thermal RC circuit) is assumed in the heat capacity of the fuser 21 is taken as the "C" value, the resistance to heat transfer is taken as the "R" value, and the heat source is considered to correspond to a DC (direct-current) voltage source.

That is, in this control process, the heat capacity of the fuser 21 in the thermal RC circuit is substituted by a capacitor C. The resistance of heat transfer is substituted by a resistor R (or resistance R). The heat source is substituted by a DC voltage source. The thermal RC circuit is a circuit that operates in response to an input voltage pulse. The thermal RC circuit is operated by the input voltage pulses that cause the on and off (connection and disconnection of the heating member/element from the DC voltage source) repeatedly based on the energization pulse. The thermal RC circuit thus applies the equivalent of heat generated as an output voltage to the heating member.

In the thermal RC circuit, the circuit values (C and R) of each element are set based on the amount of electric power supplied to the heating member, the heat capacity of the fixing rotator, and the like. The amount of heat propagated to the surface of a fixing rotator to be controlled can be estimated based on outputs of the thermal RC circuit described above. The WAE control controls the amount of electric power supplied to the heating member based on the actual surface temperature of the fixing rotator as estimated from the input energy to the fuser, and the like by estimating this heat transfer process with the thermal RC circuit. With WAE control, the fixing device in the image forming apparatus 1 controls heating such that the surface temperature of the fixing rotator reaches the target value.

The image forming apparatus 1 can identify the actual input voltage (input energy) using the power supply voltage sensing device 23. As a result, the image forming apparatus 1 provides operation control using the actual input voltage in WAE control.

Figure 4:
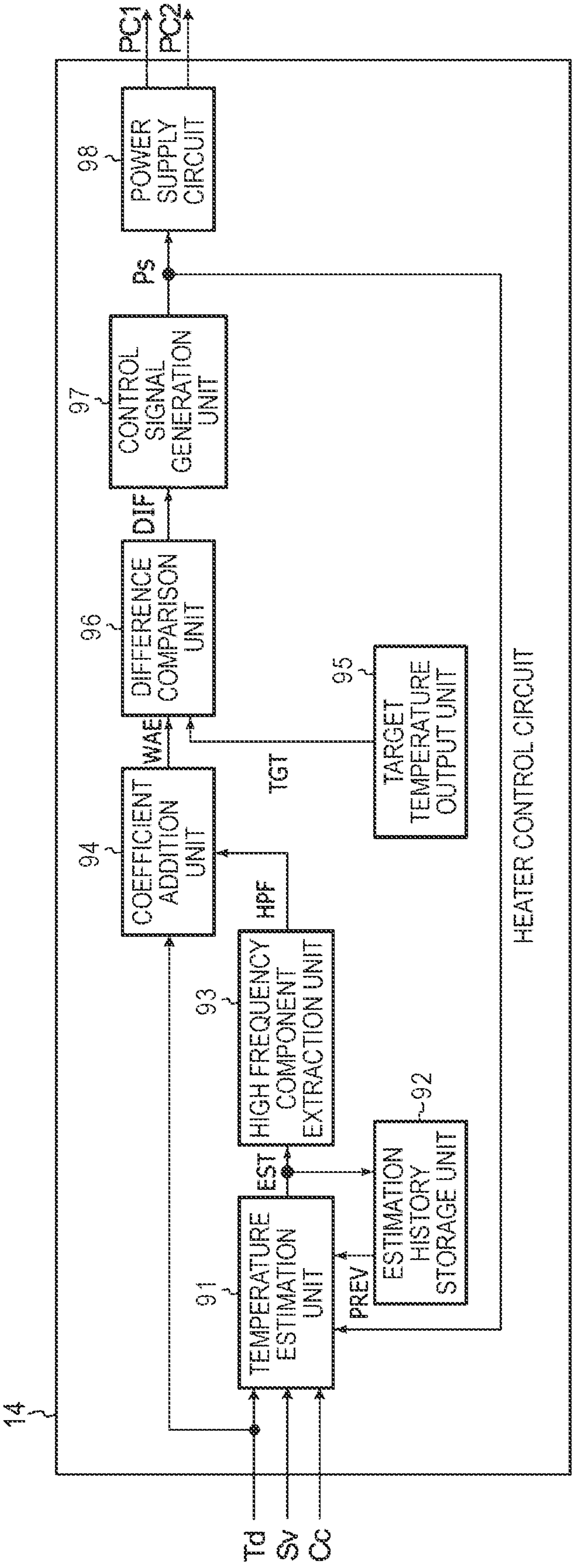
FIG. 4 is a diagram of a heater control circuit in a fixing device.

FIG. 4 is a diagram showing a configuration example of the heater control circuit 14 in the image forming apparatus 1 that performs WAE control according to an embodiment.

In the configuration example shown in FIG. 4, the heater control circuit 14 controls energization of the heater 73 of the fuser 21. The heater control circuit 14 generates the energizing powers PC1 and PC2 for energizing the heaters 73 of the fuser 21. The heater control circuit 14 supplies energizing power PC1 to the center heater 731, and supplies energizing power PC2 to the side heater 732.

The heater control circuit 14 includes a temperature estimation unit 91, an estimation history storage unit 92, a high frequency component extraction unit 93, a coefficient addition unit 94, a target temperature output unit 95, a difference comparison unit 96, a control signal generation unit 97, and a power supply circuit 98. The heater control circuit 14 receives a temperature sensing result Td from the temperature sensor 74 and the power supply voltage sensing result Sv from the controller 13 or the like.

The temperature estimation unit 91 performs a temperature estimation process for estimating the surface temperature of the heat roller 71. That is, the temperature estimation unit 91 provides a WAE estimation value for the surface temperature of the heat roller 71. In the configuration example shown in FIG. 4, the temperature estimation unit 91 receives the temperature sensing result Td from the temperature sensor 74, the power supply voltage sensing result Sv, an estimation history PREV, and an energization pulse Ps. The temperature estimation unit 91 generates a WAE estimation value based on the temperature sensing result Td, the power supply voltage sensing result Sv, the estimation history PREV, and the energization pulse Ps. The temperature estimation unit 91 outputs the WAE estimation value as a temperature estimation result EST (estimated temperature).

The temperature estimation unit 91 estimates the actual amount of heat applied to the heat roller 71 using the thermal RC circuit (in which the values of the respective elements are set in advance) based on the amount of electric power supplied to the heater 73, the heat capacity of the heat roller 71, and the like. The temperature estimation unit 91 generates the temperature estimation result EST based on the estimated amount of heat applied to the heat roller 71, the temperature sensing result Td, the power supply voltage sensing result Sv, the estimation history PREV, and the energization pulse Ps. The temperature estimation unit 91 outputs the temperature estimation result EST to the estimation history storage unit 92 and the high frequency component extraction unit 93.

In this embodiment, the temperature estimation unit 91 estimates (calculates), as the temperature estimation results EST, a center WAE estimation value ct and a side WAE estimation value st. The center WAE estimation value ct is the estimated temperature of the surface of the center region C. The side WAE estimation value st is the estimated temperature of the surface of the side region S. The temperature estimation unit 91 supplies the center WAE estimation value ct and the side WAE estimation value st to the controller 13.

The estimation history storage unit 92 stores the history of the temperature estimation result EST. That is, the results of previous estimations accumulated over prior time period. The estimation history storage unit 92 outputs the estimation history PREV, which is the historical temperature estimation result EST (past temperature estimation result EST) to the temperature estimation unit 91.

The high frequency component extraction unit 93 performs a high-pass filter process for extracting the high frequency component from the temperature estimation result EST. The high frequency component extraction unit 93 outputs a high frequency component HPF, which is a signal indicating the extracted high frequency component, to the coefficient addition unit 94.

The coefficient addition unit 94 performs a coefficient addition process for correcting the temperature detection result Td. The temperature detection result Td from the temperature sensor 74 and the high frequency component HPF from the high frequency component extraction unit 93 are input to the coefficient addition unit 94. The coefficient addition unit 94 corrects (adjusts) the temperature detection result Td based on the high frequency component HPF. Specifically, the coefficient addition unit 94 multiplies the high frequency component HPF by a preset coefficient, adds the result to the temperature detection result Td, and calculates a corrected temperature value WAE. The coefficient addition unit 94 outputs the corrected temperature value WAE to the difference comparison unit 96. The coefficient addition unit 94 outputs the corrected temperature value WAE to the processor 81 of the controller 13.

The target temperature output unit 95 outputs a set target temperature TGT to the difference comparison unit 96. The target temperature TGT is set by the controller 13.

The difference comparison unit 96 performs a difference calculation process. The difference comparison unit 96 calculates a difference DIF between the target temperature TGT from the target temperature output unit 95 and the corrected temperature value WAE from the coefficient addition unit 94. The difference comparison unit 96 outputs the calculated difference DIF to the control signal generation unit 97.

The control signal generation unit 97 generates the energization pulse Ps, which is a pulse signal for controlling energization of the heater 73 based on the difference DIF. The control signal generation unit 97 outputs the energization pulse Ps to the power supply circuit 98 and the temperature estimation unit 91.

The power supply circuit 98 supplies the energizing powers PC1 and PC2 to the heater 73 based on the energization pulse Ps. The power supply circuit 98 energizes the heater 73 of the fuser 21 using the DC power supply voltage Vdc supplied from the power conversion circuit 22. Based on the energization pulse Ps, the power supply circuit 98 switches between a state (ON state) in which the DC power supply voltage Vdc is supplied from the power conversion circuit 22 to the heater 73 and a state (OFF state) in which the DC power supply voltage Vdc is not supplied. As a result, the power supply circuit 98 supplies the heater 73 with the energizing powers PC1 and PC2. In other words, the power supply circuit 98 changes the ON time for energizing the heater 73 of the fuser 21 in response to the energization pulse Ps.

A control signal corresponding to the size of the print medium P to be used is input to the power supply circuit 98 from the processor 81 of the controller 13. The power supply circuit 98 supplies the heater 73 with the energizing power PC1 or both energizing powers PC1 and PC2 according to the value of the control signal from the processor 81 that changes according to the size of the print medium P.

In some examples, the power supply circuit 98 may be configured integrally with the fuser 21. The heater control circuit 14 may be configured to supply the energization pulse Ps to the power supply circuit of the heater 73 instead of supplying the energizing power PC to the heater 73.

As described above, based on a heat capacity correction amount Cc, the temperature sensing result Td, the power supply voltage sensing result Sv, the estimated temperature history PREV, and the energization pulse Ps, the heater control circuit 14 adjusts the surface temperature of the heat roller with the amount of electric power applied to the heater 73. As a result, the heater control circuit 14 can control the electric power to be supplied to the heater 73 such that the surface temperature of the heat roller 71 reaches the target temperature.

The temperature estimation unit 91, the estimation history storage unit 92, the high frequency component extraction unit 93, the coefficient addition unit 94, the target temperature output unit 95, the difference comparison unit 96, and the control signal generation unit 97 of the heater control circuit 14 may each be configured by an electronic circuit, or may be configured as software executing on a general purpose processor or the like. Some or all of the heater control circuit 14 may be included in the controller 13. For example, the controller 13 may be configured to calculate (estimate) the center WAE estimation value and the side WAE estimation value.

A design standard value (e.g., an expected or reference value) may be used for the heat capacity C used in the WAE control. In WAE control using a design reference value, there is a possibility that the actual heat capacity of the fuser may vary for each machine. If the power supply voltage is determined to be a rated voltage (±10%), a heat capacity correction amount Cc for the heat capacity C may be set accordingly. For example, the image forming apparatus 1 may be provided with a correction amount table indicating the heat capacity correction amount Cc to be used as a correction amount for the heat capacity C. Such a table may be provided in the data memory 84. A correction amount table stores the heat capacity correction amount corresponding to a temperature difference set for each machine type of the image forming apparatus 1. The temperature difference is a difference between the heater temperature of the fuser 21 estimated by the heater control circuit 14 when setting the heat capacity correction amount to "0" and an actually measured heater temperature.

When estimating the temperature by adding the heat capacity correction amount Cc, the heater control circuit 14 acquires the heat capacity correction amount Cc of the image forming apparatus 1 from the correction amount table from the controller 13. When the heat capacity correction amount Cc is input to the heater control circuit 14, the temperature estimation unit 91 estimates the WAE estimation value based on the temperature sensing result Td, the power supply voltage sensing result Sv, the heat capacity correction amount Cc, the estimation history PREV, and the energization pulse Ps. As a result, the temperature estimation unit 91 can output the WAE estimation value (temperature estimation result EST) using the heat capacity correction amount Cc.

Next, measurement results obtained by measuring the estimation value (WAE estimation value) of the surface temperature of the heat roller 71 in the fuser 21 under various conditions will be described.

FIGS. 5 to 10 show examples of WAE estimation values (center WAE estimation value or side WAE estimation value) when the values are measured in the ready state under various conditions.

The ready state is a control state in which the surface temperature of the heat roller 71 is maintained at a predetermined target temperature for a predetermined amount of time. A state in which printing is not being executed while still in the ready state is referred to as a maintained-ready state. For example, if the image forming apparatus 1 is activated (turned on initially), the controller 13 performs a warm-up operation to raise the temperature of the heat roller 71 to a predetermined target temperature. When the heat roller 71 reaches the predetermined target temperature, the controller 13 transitions to the ready state and maintains the heat roller 71 at the predetermined target temperature. For example, the control target for the center region C is 160° C. The control target for the side region S is 155° C.

FIGS. 5 to 10 show average values of WAE estimation values (center WAE estimation value or side WAE estimation value) during the last 20 seconds (from 40 seconds to 60 seconds) when the ready state continues for 1 minute. The last 20 seconds is a measurement time set based on the assumption that the control for maintaining the ready state after transitioning to the ready state has been stable for the relevant time duration.

FIG. 5 is a diagram showing an example of center WAE estimation values under various conditions when the sensing part of the temperature sensor 74 in the image forming apparatus 1 is not contaminated (a zero contaminate level).

FIG. 5 shows measurement results of the center WAE estimation value based on the assumption that the set values (set input voltages) of the input voltage to the heater 73 are 100 V, 120 V, and 230 V. FIG. 5 shows the center WAE estimation values if the input voltage is −10%, +10%, and no variation with respect to various set input voltages. In the example shown in FIG. 5, the center WAE estimation value (100V_A) measured under condition A and the center WAE estimation value (100V_B) measured under condition B different from condition A are illustrated with the set input voltage set to 100 V. The conditions A and B are environmental conditions related to ambient temperature or the like.

Specifically, according to the example shown in FIG. 5, if the input voltage is −10% of the input set voltage, the center WAE estimation value has a minimum value (MIN) of 174.4, a maximum value (MAX) of 195.1, and a MAX-MIN of 20.7. If the input voltage is +10% of the set input voltage, the center WAE estimation value has a minimum value (MIN) of 128.7, a maximum value (MAX) of 159.7, and a MAX-MIN of 31.0. If the input voltage is the set input voltage, the center WAE estimation value has a minimum value (MIN) of 149.0, a maximum value (MAX) of 172.9, and a MAX-MIN of 23.9.

Summarizing the measurement results, if the sensing part of the temperature sensor 74 has no contamination, the minimum and maximum values of the center WAE estimation values under all conditions are specified. If the minimum value and the maximum value of the center WAE estimation values under all conditions are specified, the difference (MAX-MIN) between the minimum and maximum values of the center WAE estimation values can be calculated. According to the example shown in FIG. 5, the center WAE estimation value if there has no contamination has a minimum value (MIN) of 128.7 and a maximum value (MAX) of 195.1. Therefore, the difference (MAX-MIN) between the maximum value and the minimum value of the center WAE estimation value if there is no contamination is 66.8.

FIG. 6 is a diagram showing an example of the side WAE estimation values under various conditions if the sensing part of the temperature sensor 74 in the image forming apparatus 1 has no contamination.

FIG. 6 shows measurement results of the side WAE estimation value based on the assumption that the set values (set input voltages) of the input voltage to the heater 73 are 100 V, 120 V, and 230 V. FIG. 6 shows the side WAE estimation values if the input voltage is −10%, +10%, and no variation with respect to various set input voltages. In the example shown in FIG. 6, the side WAE estimation value (100V_A) measured under condition A and the side WAE estimation value (100V_B) measured under condition B are shown with the set input voltage set to 100 V.

Specifically, according to the example shown in FIG. 6, if the input voltage is −10% of the input set voltage, the side WAE estimation value has a minimum value (MIN) of 197.7, a maximum value (MAX) of 207.8, and a MAX-MIN of 10.1. If the input voltage is +10% of the set input voltage, the side WAE estimation value has a minimum value (MIN) of 149.2, a maximum value (MAX) of 168.1, and a MAX-MIN of 18.9. If the input voltage is the set input voltage, the side WAE estimation value has a minimum value (MIN) of 171.4, a maximum value (MAX) of 187.0, and a MAX-MIN of 15.6.

Summarizing the measurement results, if the sensing part of the temperature sensor 74 has no contamination, the minimum and maximum values of the side WAE estimation values under various conditions are specified. If the minimum and maximum side WAE estimation values are specified, the difference (MAX-MIN) between the maximum value and the minimum value of the side WAE estimation values is calculated. According to the example shown in FIG. 6, the side WAE estimation value if there is no contamination has a minimum value (MIN) of 149.2 and a maximum value (MAX) of 207.8. Therefore, the difference (MAX-MIN) between the maximum value and the minimum value of the side WAE estimation value if there is no contamination is 58.6.

FIGS. 7 to 10 are diagrams showing examples of the WAE estimation values if the sensing part of the temperature sensor 74 is contaminated.

In these examples, a contamination state on the temperature sensor 74 was reproduced by attaching a tape functioning as a contaminant (hereinafter referred to as a pseudo-contamination tape) to the sensing part of the temperature sensor 74. For example, the pseudo-contamination tape is a heat-resistant tape formed of a polyimide-based material. A tape with a first thickness (for example, 0.21 mm) and a tape with a second thickness (for example, 0.42 mm) thicker than the first thickness are used as the pseudo-contamination tape. The tape with the first thickness of 0.21 mm is prepared by laminating three pieces of tape each 0.07 mm thick, and the tape with the second thickness of 0.42 mm is prepared by laminating six pieces of tape each 0.07 mm thick.

FIG. 7 is a diagram showing an example of the center WAE estimation values if the sensing part of the temperature sensor 74 of the fixing device according to the embodiment has a contaminant level of 0.21 mm.

FIG. 7 shows the measurement results of the center WAE estimation values under various conditions in which the 0.21 mm contaminated portion and the input voltage (various set input voltages and their variation values) are changed. In FIG. 7, it is assumed that the set value (set input voltage) of the input voltage to the heater 73 is 100 V. In the example shown in FIG. 7, the contaminant level of 0.21 mm is applied to the sensing part (referred to as c) of the temperature sensor 741, to the sensing part (referred to as s) of the temperature sensor 742, or to both of c and s.

Specifically, according to the example shown in FIG. 7, if the input voltage is −10% of the input set voltage, the center WAE estimation value has a minimum value (MIN) of 176.0, a maximum value (MAX) of 204.2, and a MAX-MIN of 28.2. If the input voltage is +10% of the set input voltage, the center WAE estimation value has a minimum value (MIN) of 141.5, a maximum value (MAX) of 175.0, and a MAX-MIN of 33.5. If the input voltage is the set input voltage (100 V), the center WAE estimation value has a minimum value (MIN) of 162.7, a maximum value (MAX) of 186.4, and a MAX-MIN of 23.7.

From the measurement results, the minimum value (141.5) and maximum value (204.2) of the center WAE estimation values under various conditions with a contamination level of 0.21 mm and varying input voltage are specified. According to the example shown in FIG. 7, the difference (MAX-MIN) between the minimum and maximum center WAE estimation values is 62.7 if the sensing part of the temperature sensor 74 has a contaminant level of 0.21 mm.

FIG. 8 is a diagram showing an example of the side WAE estimation values if the sensing part of the temperature sensor 74 of the fixing device according to the embodiment has a contaminant level of 0.21 mm.

FIG. 8 shows the measurement results of the side WAE estimation values under various conditions in which the 0.21 mm contaminated portion and the input voltage (various set input voltages and their variation values) are changed. In FIG. 8, it is assumed that the set value (set input voltage) of the input voltage to the heater 73 is 100 V. In the example shown in FIG. 8, the contaminant level of 0.21 mm is applied to the sensing part (c) of the temperature sensor 741, to the sensing part (s) of the temperature sensor 742, or to both of c and s.

In the example shown in FIG. 8, if the input voltage is −10% of the input set voltage, the side WAE estimation value has a minimum value (MIN) of 190.7, a maximum value (MAX) of 228.6, and a MAX-MIN of 37.8. If the input voltage is +10% of the set input voltage, the side WAE estimation value has a minimum value (MIN) of 147.5, a maximum value (MAX) of 188.1, and a MAX-MIN of 40.5. If the input voltage is the set input voltage (100 V), the side WAE estimation value has a minimum value (MIN) of 164.9, a maximum value (MAX) of 209.6, and a MAX-MIN of 44.7.

From the measurement results, the minimum value (147.5) and maximum value (228.6) of the side WAE estimation values under various conditions with a contamination level of 0.21 mm and varying input voltage are specified. According to the example shown in FIG. 8, the difference (MAX-MIN) between the minimum and maximum side WAE estimation values is 81.1 if the sensing part of the temperature sensor 74 has a contaminant level of 0.21 mm.

FIG. 9 is a diagram showing an example of the center WAE estimation value if the sensing part of the temperature sensor 74 of the fixing device according to the embodiment has a contaminant level of 0.42 mm.

FIG. 9 shows the measurement results of the center WAE estimation values under various conditions in which the 0.42 mm contaminated portion and the input voltage (various set input voltages and their variation values) are changed. In FIG. 9, it is assumed that the set values (set input voltages) of the input voltage to the heater 73 are 100 V, 120 V, and 230 V. In the example shown in FIG. 9, the contaminant level of 0.42 mm is applied to the sensing part (c) of the temperature sensor 741, to the sensing part (s) of the temperature sensor 742, or to both of c and s. In the example shown in FIG. 9, the center WAE estimation value (100V_A) measured under condition A and the center WAE estimation value (100V_B) measured under condition B are shown with the set input voltage set to 100 V.

In the example shown in FIG. 9, if the input voltage is −10% of the set input voltage, the center WAE estimation value has a minimum value of 149.0, a maximum value of 225.7, and a MAX-MIN of 76.7. If the input voltage is +10% of the set input voltage, the center WAE estimation value has a minimum value of 106.8, a maximum value of 187.1, and a MAX-MIN of 80.3. If the input voltage is the set input voltage, the center WAE estimation value has a minimum value of 129.9, a maximum value of 203.5, and a MAX-MIN of 73.6.

From the measurement results, the minimum value (106.8) and maximum value (225.7) of the center WAE estimation values under various conditions with a contamination level of 0.42 mm and varying input voltage are specified. According to the example shown in FIG. 9, the difference (MAX-MIN) between the minimum and maximum center WAE estimation values is 118.9 if the sensing part of the temperature sensor 74 has a contaminant level of 0.42 mm.

FIG. 10 is a diagram showing an example of the side WAE estimation values if the sensing part of the temperature sensor 74 of the fixing device according to the embodiment has a contaminant level of 0.42 mm.

FIG. 10 shows the measurement results of the side WAE estimation values under various conditions in which the 0.42 mm contaminated portion and the input voltage (various set input voltages and their variation values) are changed. In FIG. 10, it is assumed that the set values (set input voltages) of the input voltage to the heater 73 are 100 V, 120 V, and 230 V. In the example shown in FIG. 10, the contaminant level of 0.42 mm is applied to the sensing part (c) of the temperature sensor 741, to the sensing part (s) of the temperature sensor 742, or to both of c and s. In the example shown in FIG. 10, the side WAE estimation value (100V_A) measured under condition A and the side WAE estimation value (100V_B) measured under condition B are shown with the set input voltage set to 100 V.

In the example shown in FIG. 10, if the input voltage is −10% of the set input voltage, the side WAE estimation value has a minimum value of 162.9, a maximum value of 244.7, and a MAX-MIN of 81.8. If the input voltage is +10% of the set input voltage, the side WAE estimation value has a minimum value of 114.0, a maximum value of 208.0, and a MAX-MIN of 94.0. If the input voltage is the set input voltage, the side WAE estimation value has a minimum value of 133.8, a maximum value of 221.6, and a MAX-MIN of 87.8.

From the measurement results, the minimum value (114.0) and maximum value (244.7) of the side WAE estimation values under various conditions with a contamination level of 0.42 mm and varying input voltage are specified. According to the example shown in FIG. 10, the difference (MAX-MIN) between the minimum and maximum side WAE estimation values is 130.7 if the sensing part of the temperature sensor 74 has a contaminant level of 0.42 mm.

FIG. 11 is a diagram showing an example of state estimation for the difference between the maximum value and the minimum value of WAE estimation values for the contaminant level of the sensing part of the temperature sensor 74.

FIG. 11 summarizes the measurement results of the WAE estimation values (center WAE estimation values or side WAE estimation values) shown in FIGS. 5 to 10.

For example, the difference (ct) between the maximum value and the minimum value of the center WAE estimation values is specified from the measurement results shown in FIG. 5 if the sensing part of the temperature sensor 74 has no contamination. In FIG. 5, difference ct under all conditions is 66.1, and the maximum difference between the maximum value and the minimum value for each input voltage is 31.0. Therefore, if difference ct≤31.0, it is estimated that the temperature sensor is normal, that the input voltage does not vary, and that there is no actual temperature rise (difference between the actual temperature in the center area of the heat roller and the temperature sensed by the temperature sensor 741). If 30.1<difference ct≤66.1 is satisfied, it is estimated that the temperature sensor is normal and that the voltage variation of the input voltage is within ±10%.

If the sensing part of the temperature sensor 74 has no contamination, the difference (st) between the maximum value and the minimum value of the side WAE estimation value can be specified from the measurement results shown in FIG. 6. In FIG. 6, difference st under all conditions is 58.6, and the maximum difference between the maximum value and the minimum value for each input voltage is 18.9. Therefore, if difference st≤18.9, it is estimated that the temperature sensor is normal, that the input voltage does not vary, and that the actual temperature does not rise. If 18.9<difference st≤58.6 is satisfied, it is estimated that the temperature sensor is normal, that the voltage variation of the input voltage is within ±10%, and that the actual temperature does not rise.

If the sensing part of the temperature sensor 74 has a contaminant level of 0.21 mm, the difference (ct) between the maximum value and the minimum value of the center WAE estimation values is specified from the measurement result shown in FIG. 7. In FIG. 7, difference ct under all conditions is 62.7, and the minimum difference between the maximum value and the minimum value for each input voltage is 23.7. Therefore, if the relationship 23.7≤difference ct≤62.7 is satisfied, it is estimated that the temperature sensor is abnormal (there is contamination), that the voltage variation of the input voltage is within ±10%, and that the actual temperature rises (7.2 to 13.9° C.). Note that the actual temperature rise (7.2 to 13.9° C.) is a value estimated if there is 0.21 mm of contamination, and it cam be specified from separate measurement results and the like.

If the sensing part of the temperature sensor 74 has a contaminant level of 0.21 mm, the difference (st) between the maximum value and the minimum value of the side WAE estimation values is specified from the measurement result shown in FIG. 8. In FIG. 8, difference st under all conditions is 81.1, and the minimum difference between the maximum value and the minimum value for each input voltage is 37.9. Therefore, if 37.9 difference st≤81.1 is satisfied, it is estimated that the temperature sensor is abnormal (there is contamination), that the voltage variation of the input voltage is within ±10%, and that the actual temperature rises (6.4 to 11.5° C.). Note that the actual temperature rise (6.4 to 11.5° C.) is a value estimated if there is 0.21 mm of contamination, and it can be specified from separate measurement results and the like.

If the sensing part of the temperature sensor 74 has a contaminant level of 0.42 mm, the difference (ct) between the maximum value and the minimum value of the center WAE estimation values is specified from the measurement result shown in FIG. 9. In FIG. 9, difference ct under all conditions is 118.9, and the minimum difference between the maximum value and the minimum value for each input voltage is 73.6. Therefore, if 73.6≤difference ct≤118.9 is satisfied, it is estimated that the temperature sensor is abnormal (there is contamination), that the voltage variation of the input voltage is within ±10%, and that the actual temperature rises (23.0 to 32.2° C.). Note that the actual temperature rise (23.0 to 32.2° C.) is a value estimated if there is 0.42 mm of contamination, and can be specified from separate measurement results and the like.

If the sensing part of the temperature sensor 74 has a contaminant level of 0.42 mm, the difference (st) between the maximum value and the minimum value of the side WAE estimation values is specified from the measurement result shown in FIG. 10. In FIG. 10, difference st under all conditions is 130.7, and the minimum difference between the maximum value and the minimum value for each input voltage is 81.8. Therefore, if 81.8≤difference st≤130.7 is satisfied, it is estimated that the temperature sensor is abnormal (there is contamination), that the voltage variation of the input voltage is within ±10%, and that the actual temperature rises (18.5 to 25.4° C.). Note that the actual temperature rise (18.5 to 25.4° C.) is a value estimated if there is 0.42 mm of contamination, and can be specified from separate measurement results and the like.

FIG. 12 is a diagram showing an example of state estimation according to the difference (ct) between the maximum value and the minimum value of center WAE estimation in the fixing device according to an embodiment.

According to the measurement results shown in FIG. 11 and the like, the state of the temperature sensor, the variation in the input voltage, and the actual temperature rise can be specified from the difference (ct) being between the maximum value and the minimum value of the center WAE estimation. In the fixing device according to the embodiment, a threshold can be set based on the measurement result as shown in FIG. 11, and this specifies the state of the fixing device (the state of the temperature sensor, the voltage variation, and the actual temperature rise) from the difference (ct) between the maximum value and the minimum value of the center WAE estimation.

In the example shown in FIG. 12, the value "23.8" (first center threshold), the value "62.6" (second center threshold), and the value "118.9" (third center threshold) are set as the relevant thresholds for the difference ct.

According to the measurement results shown in FIG. 11, if difference ct is 23.8 or less, the sensor is normal, the supply voltage does not vary, and the actual temperature does not rise. Therefore, in FIG. 12, if difference ct≤23.8, the temperature sensor is considered normal, the input voltage does not vary, and the actual temperature does not rise.

In FIG. 11, if the contamination level is 0.21 mm, 23.8<difference ct≤62.6, the sensor is abnormal, the voltage variation is within ±10%, and the actual temperature rise is 7.2° C. to 13.9° C. However, in FIG. 11, difference ct≤66.4 is met even if there is no contamination. Therefore, in FIG. 12, if 23.8<difference ct≤62.6, there is a possibility that the temperature sensor is abnormal, the voltage variation is within ±10%, and the actual temperature rise (7.2° C. to 13.9° C.) is possible.

In FIG. 11, if the contamination level is 0.42 mm, 62.6<difference ct≤118.9, the sensor is abnormal, the voltage variation is within ±10%, and the actual temperature rise is 23.0° C. to 32.2° C. Therefore, in FIG. 12, if 62.6<difference ct≤118.9, the sensor is abnormal, the voltage variation is within ±10%, and the actual temperature rises (23.0° C. to 32.2° C.).

When 118.9<difference ct is a range exceeding the range shown in FIG. 11 and exceeding the value of difference ct obtained from the measurement results of the center estimation values under various conditions. Therefore, in FIG. 12, if 118.9<difference ct, the temperature sensor is abnormal, the voltage variation of the input voltage is ±10% or more, and the actual temperature rise is 23.0 to 32.2° C. or more.

FIG. 13 is a diagram illustrating an example of the state estimation with respect to the difference (st) between a maximum value and a minimum value of side WAE estimation in the fixing device according to an embodiment.

According to the measurement results shown in FIG. 11 and the like, the state of the temperature sensor, the voltage variation, and the actual temperature rise can be specified from the difference (st) between the maximum value and the minimum value of the side WAE estimation. The fixing device according to the embodiment sets the threshold for difference st based on the measurement result as shown in FIG. 11. For example, by setting thresholds as shown in FIG. 13, the fixing device can specify the state of the temperature sensor, the voltage variation of the input voltage, and the actual temperature rise from the value of difference st.

In the example shown in FIG. 13, the relevant thresholds for difference st are the value "18.9" (first side threshold), the value "37.9" (second side threshold), the value "81.1" (third side threshold), and the value "130.7" (fourth side threshold).

According to the measurement results shown in FIG. 11, if difference st is 18.9 or less, the sensor is normal, the supply voltage does not vary, and the actual temperature does not rise. Therefore, in FIG. 13, if difference st≤18.9, the temperature sensor is normal, the input voltage does not vary, and the actual temperature does not rise.

In FIG. 11, if 18.9<difference st≤37.9, the sensor is normal, the voltage variation of the input voltage is within ±10%, and the actual temperature does not rise. Therefore, in FIG. 13, if 18.9<difference st≤37.9, the temperature sensor is normal, the voltage variation of the input voltage is within ±10%, and the actual temperature does not rise.

In FIG. 11, if the contamination level is 0.21 mm, 37.9<difference st≤81.1, the sensor is abnormal, the voltage variation is within ±10%, and the actual temperature rise is 6.4 to 11.5° C. Therefore, in FIG. 13, if 37.9<difference st≤81.1, the temperature sensor is abnormal, the voltage variation of the input voltage is within ±10%, and the actual temperature rises (6.4° C. to 11.5° C.).

In FIG. 11, if the contaminant is 0.42 mm, 81.1<difference st≤130.7, the sensor is abnormal, the voltage variation is within ±10%, and the actual temperature rise is 18.5° C. to 25.4° C. Therefore, in FIG. 13, if 81.1<difference st≤130.7, the temperature sensor is abnormal, the voltage variation of the input voltage is within ±10%, and the actual temperature rises (18.5° C. to 25.4° C.).

130.7<st is a range exceeding the range shown in FIG. 11 and exceeding the value of st obtained from the measurement results of the center estimation values under various conditions. Therefore, in FIG. 13, if 130.7<difference st, the temperature sensor is abnormal, the voltage variation of the input voltage is ±10% or more, and the actual temperature rise is 18.5° C. to 25.4° C. or more.

Next, operations of a state prediction process in the image forming apparatus 1 including the fuser 21 according to an embodiment will be described.

Figure 14:
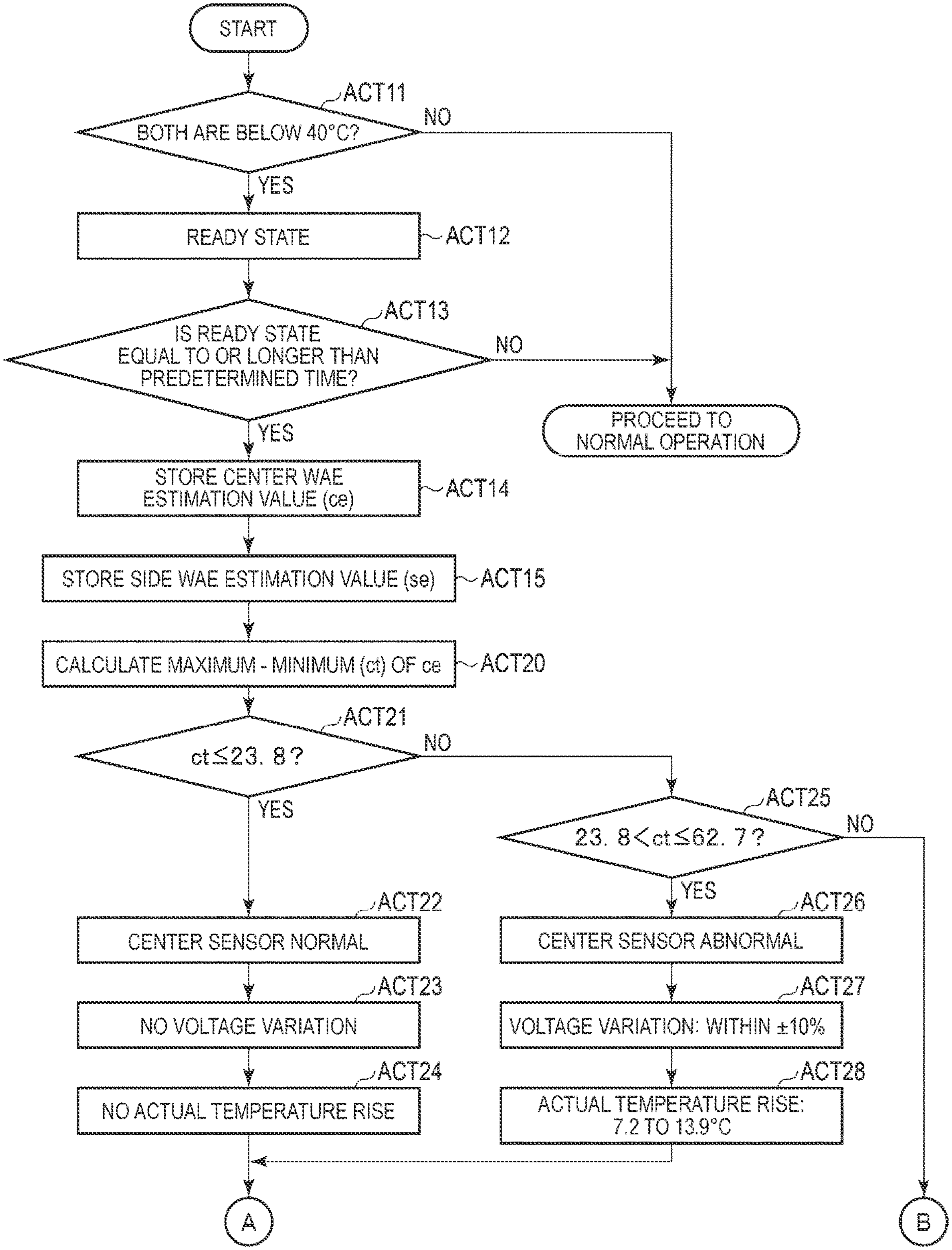
FIG. 14 is a flowchart provided to explain an operation example of state prediction process in an image forming apparatus including a fixing device.
Figure 15:
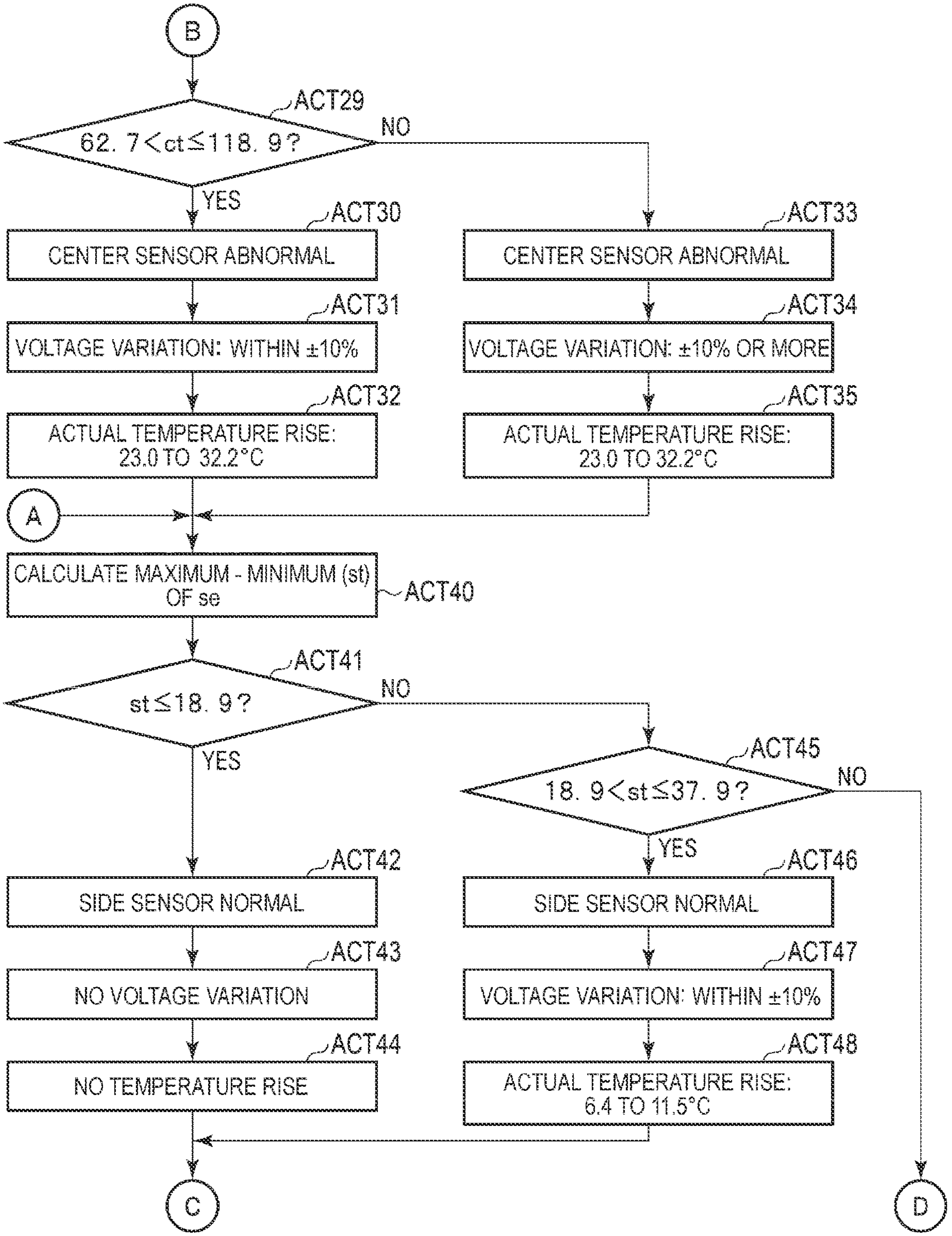
FIG. 15 is a flowchart provided to explain an operation example of a state prediction process in an image forming apparatus including a fixing device.
Figure 16:
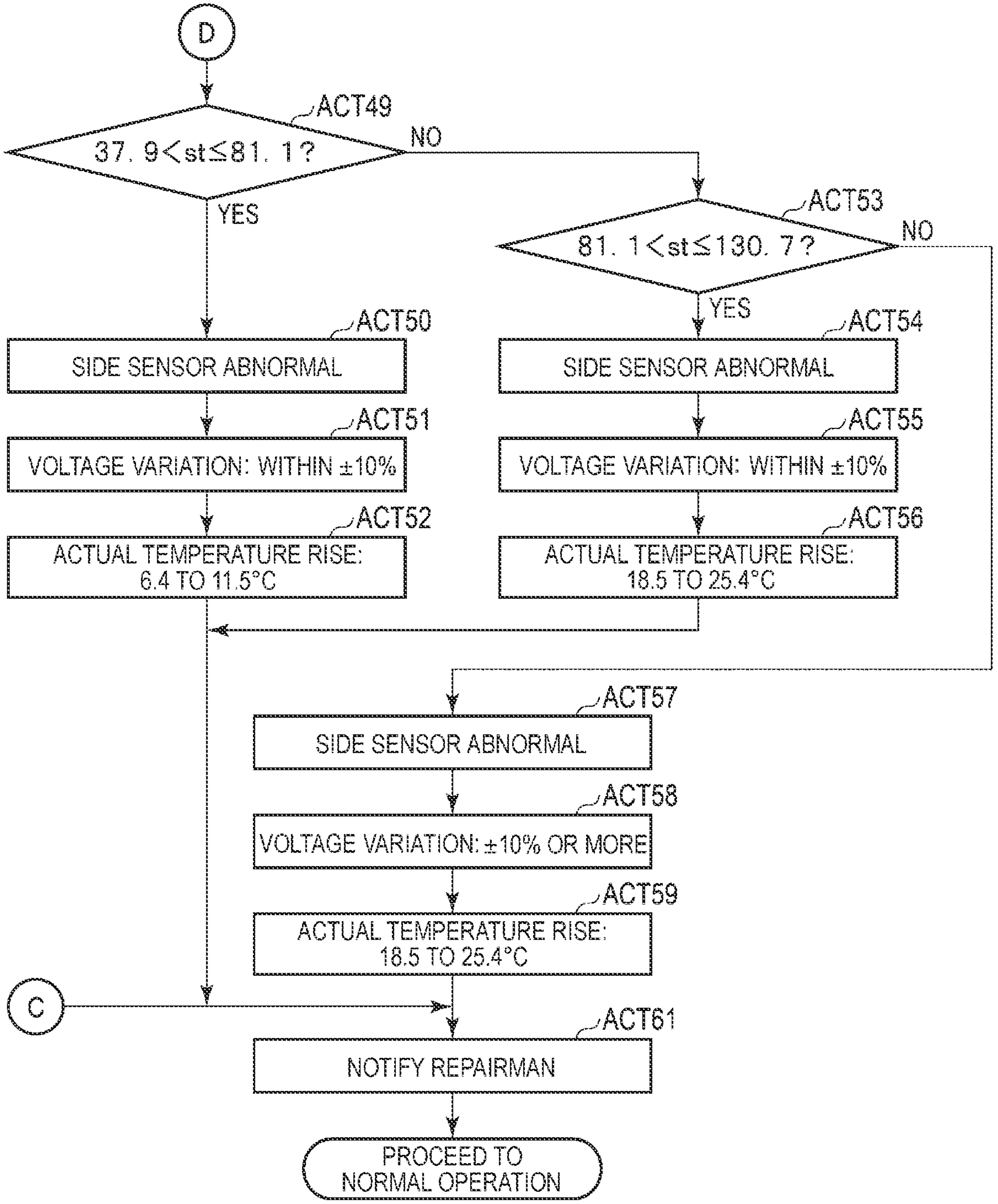
FIG. 16 is a flowchart provided to explain an operation example of a state prediction process in an image forming apparatus including a fixing device.

FIGS. 14, 15, and 16 are flowcharts provided to explain an operation example of the state prediction process in the image forming apparatus 1 including the fuser 21 according to an embodiment.

For example, the controller 13 executes the state prediction process by causing the processor 81 to execute a program for the state prediction process. The program for the state prediction process executed by the processor 81 can be stored in a non-volatile memory such as the ROM 82 or the data memory 84.

First, the controller 13 turns on the entire image forming apparatus 1. After the power of the entire apparatus is turned on, the controller 13 acquires the temperature sensed by the temperature sensor 741 and the temperature sensed by the temperature sensor 742. The controller 13 confirms whether both the temperature sensed by the temperature sensor 741 and the temperature sensed by the temperature sensor 742 are 40° C. or less (ACT 11).

If either the temperature sensed by the temperature sensor 741 or the temperature sensed by the temperature sensor 742 exceeds 40° C. (ACT 11, NO), the controller 13 omits the state prediction process. When omitting the state prediction process, the controller 13 transitions directly to normal operation.

The controller 13 performs a warm-up operation if both the temperature sensed by the temperature sensor 741 and the temperature sensed by the temperature sensor 742 are 40° C. or less (ACT 11, YES). Once the warm-up operation is completed, the controller 13 transitions to the ready state and displays a guide (ready display) indicating the ready state on the display device 15 (ACT 12).

The controller 13 counts the time for which the ready state (standby state) continues without interruption (duration of the maintained-ready state) after transitioning to the ready state. The controller 13 determines whether the counted duration in the maintained-ready state is equal to or longer than a predetermined time (for example, 1 minute) (ACT 13). While the ready state continues (in the maintained-ready state), the controller 13 stores the estimation value of the temperature of the center region C (center WAE estimation value) and the estimation value of the temperature of the side region S (side WAE estimation value) in a memory such as the RAM 83.

In an embodiment, the controller 13 stores, in the memory, the center WAE estimation values and the side WAE estimation values at a predetermined measurement time intervals for the duration of the ready state. For example, the measurement time period is the last 20 seconds of every 1 minute in the ready state (e.g., the period of time from 40 seconds to 60 seconds after transitioning to the ready state).

If the duration in the maintained-ready state is not equal to or longer than the predetermined time (ACT 13, NO), the controller 13 omits the state prediction and transitions to normal operation. For example, when printing is to be started before the the maintained-ready state time reaches or exceeds the predetermined time, the controller 13 omits the state prediction and goes ahead to perform a printing operation.

If the duration in the maintained-ready state is equal to or longer than a predetermined time (ACT 13, YES), the controller 13 stores the center WAE estimation values and the side WAE estimation values over the last measurement time (for example, the last 20 seconds) of the time (1 minute) during which the maintained-ready state continued (ACTs 14, 15).

The controller 13 calculates the average value of the center WAE estimation values for a predetermined measurement period during the maintained-ready state. The controller 13 stores the calculated average value of the center WAE estimation values for the predetermined measurement period in the maintained-ready state in the data memory 84 as the center WAE estimation value (ACT 14).

The controller 13 calculates the average value of the side WAE estimation values for the predetermined measurement period in the maintained-ready state. The controller 13 stores the calculated average value of the side WAE estimation values in the data memory 84 as the side WAE estimation value (ACT 15).

The controller 13 uses the center WAE estimation value and the side WAE estimation value stored in the data memory 84 to perform processes for determining (estimating/predicting) various states of the fixing device (see ACTs 20 to 35 and ACTs 40 to 59).

First, the processes (ACTs 20 to 35) for determining (estimating, predicting) various states of the fixing device using the center WAE estimation values stored in the data memory 84 will be described.

The controller 13 extracts the maximum value and the minimum value of the center WAE estimation values for the past predetermined period stored in the data memory 84. For example, the predetermined period may be a period from a maintenance operation performed on the image forming apparatus 1 or may be a fixed period set by a repairman or administrator. The controller 13 calculates the difference (ct) between the maximum value and the minimum value selected from the center WAE estimation values for the past predetermined period (ACT 20).

After calculating the difference ct between the minimum and maximum center WAE estimation values, the controller 13 determines whether the calculated difference ct is equal to or less than 23.8 (first center threshold value) (ACT 21). If difference ct≤23.8 (ACT 21, YES), the controller 13 determines (estimates) that the temperature sensor 741 (center sensor) is normal (ACT 22). If difference ct≤23.8 (ACT 21, YES), the controller 13 determines (estimates) that there is no voltage variation in the input (power supply) voltage (ACT 23). If ct≤23.8 (ACT 21, YES), the controller 13 determines (estimates) that there is no rise in the actual temperature (difference between the actual temperature in the center region C and the temperature sensed by the temperature sensor 741) (ACT 24).

If difference ct is not equal to or less than 23.8 (ACT 21, NO), the controller 13 next determines whether difference ct satisfies 23.8<difference ct≤62.7 (second center threshold) (ACT 25). If 23.8<difference ct≤62.7 (ACT 25, YES) is satisfied, the controller 13 determines (estimates) that there is a possibility that the temperature sensor 741 (center sensor) is abnormal (ACT 26). If 23.8<difference ct≤62.7 (ACT 25, YES), the controller 13 determines (estimates) that the voltage variation of the input (power supply) voltage is within ±10% (ACT 27).

If 23.8<difference ct≤62.7 (ACT 25, YES), the controller 13 determines (estimates) that the actual temperature rise (difference between the actual temperature in the center region C and the temperature sensed by the temperature sensor 741) is 7.2° C. to 13.9° C. (first center rise value) (ACT 28). If it is determined that the actual temperature is risen, the controller 13 can update the high stop temperature of the center region C in response to the rise of the actual temperature (the first center rise value). The controller 13 and the heater control circuit 85 are set to forcibly turn off the center heater 731 if the temperature sensed by the temperature sensor 741 exceeds the high stop temperature.

When not 23.8<difference ct≤62.7 is not satisfied (ACT 25, NO), the controller 13 next determines whether difference ct satisfies 62.7<difference ct≤118.9 (third center threshold) (ACT 29). If 62.7<difference ct≤118.9 (ACT 29, YES), the controller 13 determines (estimates) that there is an abnormality in the temperature sensor 741 (center sensor) (ACT 30). If 62.7<difference ct≤118.9 (ACT 29, YES), the controller 13 determines (estimates) that the voltage variation of the input (power supply) voltage is within ±10% (ACT 31).

If 62.7<difference ct≤118.9 (ACT 29, YES), the controller 13 determines (estimates) that the actual temperature rise (difference between the actual temperature and the temperature sensed by the temperature sensor 741) is 23.0° C. to 32.2° C. (second center rise value) (ACT 32). If it is determined that the actual temperature is risen, the controller 13 can update the high stop temperature of the center region C in response to the rise of the actual temperature (first center rise value).

When not satisfying 62.7<difference ct≤118.9 (ACT 29, NO), the controller 13 determines that difference ct is greater than 118.9. If difference ct>118.9 (ACT 29, NO), the controller 13 determines (estimates) that there is an abnormality in the temperature sensor 741 (center sensor) (ACT 33). If difference ct>118.9 (ACT 29, NO), the controller 13 determines (estimates) that the voltage variation of the input (power supply) voltage is ±10% or more (ACT 34).

If difference ct>118.9 (ACT 29, NO), the controller 13 determines (estimates) that the actual temperature rise (difference between the actual temperature and the temperature sensed by the temperature sensor 741) is 23.0° C. to 32.2° C. (second center rise value) or more (ACT 35). If it is determined that the actual temperature is risen, the controller 13 can update the high stop temperature of the center region C in response to the rise of the actual temperature (second center rise value).

Next, processes (ACTs 40 to 59) in which the controller 13 uses the side WAE estimation values stored in the data memory 84 to determine (estimate) various states of the fixing device will be described.

The controller 13 extracts the maximum and minimum values of the side WAE estimation values for the past predetermined period stored in the data memory 84. The controller 13 calculates the difference (st) between a maximum value and a minimum value of the side WAE estimation values for the past predetermined period (ACT 40).

After calculating the difference st between the minimum and maximum side WAE estimation values, the controller 13 determines whether the calculated difference st is equal to or less than 18.9 (first side threshold) (ACT 41). If difference st 18.9 (ACT 41, YES), the controller 13 determines (estimates) that the temperature sensor 742 (side sensor) is normal (ACT 42). If difference st≤18.9 (ACT 41, YES), the controller 13 determines (estimates) that there is no voltage variation in the input (power supply) voltage (ACT 43). If difference st≤18.9 (ACT 41, YES), the controller 13 determines (estimates) that there is no rise in the actual temperature (difference between the actual temperature in the side region S and the temperature sensed by the temperature sensor 742) (ACT 44).

If difference st is not equal to or less than 18.9 (ACT 41, NO), the controller 13 next determines whether difference st is 18.9<difference st≤37.9 (second side threshold) (ACT 45). If 18.9<difference st≤37.9 (ACT 45, YES), the controller 13 determines (estimates) that the temperature sensor 742 (side sensor) is normal (ACT 46). If 18.9<difference st≤37.9 (ACT 45, YES), the controller 13 determines (estimates) that the voltage variation of the input (power supply) voltage is within ±10% (ACT 47).

If 18.9<difference st≤37.9 (ACT 45, YES), the controller 13 determines (estimates) that the actual temperature rise is 6.4° C. to 11.5° C. (first side rise value) (ACT 48). If it is determined that the actual temperature is risen, the controller 13 can update the high stop temperature of the side region S in response to the rise of the actual temperature (first side rise value).

When 18.9<difference st≤37.9 is not satisfied (ACT 45, NO), the controller 13 next determines whether difference st satisfies 37.9<difference st≤81.1 (third side threshold) (ACT 49). If 37.9<difference st≤81.1 (ACT 49, YES), the controller 13 determines (estimates) that there is an abnormality (contaminant) in the temperature sensor 742 (side sensor) (ACT 50). If 37.9<difference st≤81.1 (ACT 49, YES), the controller 13 determines (estimates) that the voltage variation of the input (power supply) voltage is within ±10% (ACT 51).

If 37.9<difference st≤81.1 (ACT 49, YES), the controller 13 determines (estimates) that the actual temperature rise is 6.4° C. to 11.5° C. (first side rise value) (ACT 52). If it is determined that the actual temperature is risen, the controller 13 can update the high stop temperature of the side region S in response to the rise of the actual temperature (first side rise value).

When 37.9<difference st≤81.1 is not satisfied (ACT 49, NO), the controller 13 determines whether difference st satisfies 81.1<difference st≤130.7 (fourth side threshold) (ACT 53). If 81.1<difference st≤130.7 (ACT 53, YES), the controller 13 determines (estimates) that there is an abnormality (contaminant) in the temperature sensor 742 (side sensor) (ACT 54). If 81.1<difference st≤130.7 is satisfied (ACT 53, YES), the controller 13 determines (estimates) that the voltage variation of the input (power supply) voltage is within ±10% (ACT 55).

If 81.1<difference st≤130.7 (ACT 53, YES), the controller 13 determines (estimates) that the actual temperature rise is 18.5° C. to 25.4° C. (second side rise value) (ACT 56). If it is determined that the actual temperature is risen, the controller 13 can update the high stop temperature of the side region S in response to the rise of the actual temperature (second side rise value).

When satisfying 81.1<st≤130.7 is not satisfied (ACT 53, NO), the controller 13 determines that difference st is greater than 130.7. If difference st>130.7 (ACT 53, NO), the controller 13 determines (estimates) that there is an abnormality (contaminant) in the temperature sensor 742 (side sensor) (ACT 57). If difference st>130.7 (ACT 53, NO), the controller 13 determines (estimates) that the voltage variation of the input (power supply) voltage is ±10% or more (ACT 58).

If difference st>130.7 (ACT 53, NO), the controller 13 determines (estimates) that the actual temperature rise is 18.5° C. to 25.4° C. (second side rise value) or more (ACT 59). If it is determined that the actual temperature is risen, the controller 13 can update the high stop temperature of the side region S in response to the rise of the actual temperature (the second side rise value).

After the state determination (estimation, prediction) by ACTs 20 to 35 and 40 to 59 is completed, the controller 13 notifies (reports) the determination result to a repairman or the like via the communication interface 12 (ACT 61). The controller 13 may display information indicating the determination results of ACTs 20 to 35 and 40 to 59 on the display device 15.

Note that the controller 13 may omit the notification to the repairman (process of ACT 61) if difference ct≤23.8 and difference st≤18.9. This is because if difference ct≤23.8 and difference st≤18.9, it is estimated that each temperature sensor is normal and the input voltage does not vary in a significant manner.

As described above, the fixing device according to an embodiment stores the center WAE estimation values and the side WAE estimation values obtained while in the ready state in a data memory. The fixing device then determines (predicts) the state of the temperature sensor, the input voltage, the actual temperature rise, and the like from the difference between the maximum value and the minimum value of a plurality of center WAE estimation values over a predetermined period. The fixing device determines (predicts) the state of the temperature sensor, the input voltage variation, the actual temperature rise, and the like from the difference between the maximum value and the minimum value of a plurality of side WAE estimation values for a predetermined period. As a result, the fixing device can predict various states caused by contamination of the sensing part of a temperature sensor, for example.

The fixing device according to an embodiment sends, to an external device, the state determination results such as the temperature sensor, the input voltage variation, and the actual temperature rise predicted from the difference between the maximum value and the minimum value of a plurality of WAE estimation values. As a result, the fixing device enables the repairman or the like to be warned before the occurrence of a failure caused by deterioration or breakage of a component due to use at a high temperature so as to prevent the downtime due to such a failure.

In an embodiment described above, the image forming apparatus 1 including the fuser 21 of the first configuration example shown in FIGS. 1 and 2 was described. However, the configuration of a fuser to be used in an image forming apparatus 1 according to an embodiment is not limited to the first configuration example shown in FIGS. 1 and 2. The image forming apparatus 1 is not limited to the fuser 21 of the first configuration example, and fusers of other configuration examples, such as those described below, can be applied.

Modifications of a fuser that can be used in an image forming apparatus 1 according to the embodiment will be described below.

First, a fuser 200 is a second example of a fuser that can be applied to the image forming apparatus 1 according to the embodiment will be described.

Figure 17:
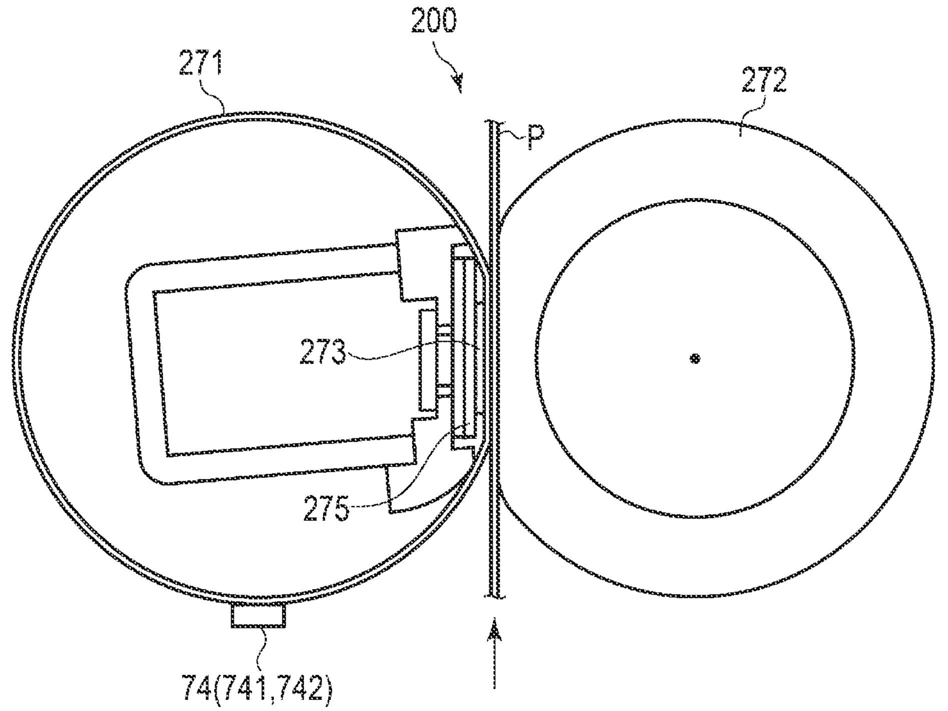
FIG. 17 is a diagram illustrating a second configuration example of a fuser used in a fixing device.
Figure 18:
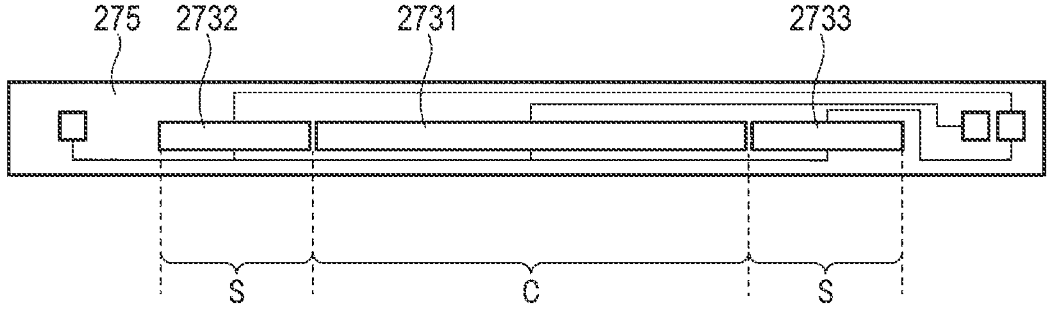
FIG. 18 is a diagram illustrating a configuration example of a heater unit in a fuser of a second configuration example used in a fixing device.

FIG. 17 is a diagram showing a configuration example of the fuser 200. FIG. 18 is a diagram showing a configuration example of a heater unit in the fuser 200.

As shown in FIG. 17, the fuser 200 includes the temperature sensors 74 (741, 742), a tubular film 271 as a fixing member, a pressure roller 272, a heating element 273, a heating element substrate 275, and the like. The pressure roller 272 forms a nip between itself and the tubular film 271. The tubular film 271 and the pressure roller 272 press and heat the print medium P entering the nip.

The heater unit includes the heating element 273, the heating element substrate 275, and the like. The heating element substrate 275 can be made of metal material, ceramic material, or the like. The heating element substrate 275 is formed as an elongated rectangular plate shape. The heating element substrate 275 is disposed inside the tubular film 271. The longitudinal direction of the heating element substrate 275 is parallel to the axial direction of the tubular film 271.

The heating element 273 includes a central heating element 2731, a first end heating element 2732, and a second end heating element 2733. The three heating elements 2731, 2732, and 2733 are arranged side by side in a direction along the longitudinal direction of the heating element substrate 275 and perpendicular to the paper conveying direction. The central heating element 2731 is disposed to be aligned with the central position (middle) of the print medium P passing through the nip in the width direction (the direction orthogonal to the conveying direction). The first end heating element 2732 and the second end heating element 2733 are arranged on both sides of the central heating element 2731.

The central heating element 2731 is an example of the first heat source. As shown in FIG. 18, the central heating element 2731 supplies heat mainly to the center region C. Even when only the central heating element 2731 is heated, the temperature of the side region S also rises. The first end heating element 2732 and the second end heating element 2733 are examples of the second heat source. As shown in FIG. 18, the first end heating element 2732 and the second end heating element 2733 supply heat mainly to the side region S.

The temperature sensors 741 and 742 are contact-type temperature sensing devices such as thermistors, as in the first configuration example. The temperature sensor 741 senses the temperature of the position corresponding to the center region C heated by the central heating element 2731. The temperature sensor 742 senses the temperature of the position corresponding to the side region S heated by the end heating element 2732 or 2733.

The WAE control described above is also possible for the fuser 200 shown in FIGS. 17 and 18. Therefore, the image forming apparatus 1 including the fuser 200 shown in FIGS. 17 and 18 can also perform the state prediction process using the WAE estimation values as described above. However, for the image forming apparatus 1 including the fuser 200, the set values shown in FIGS. 12 and 13 cannot be applied as they are without modification. Information indicating the state estimated by the difference ct between the maximum value and the minimum value of the center WAE estimation values as shown in FIG. 12 needs to be set separately for each machine type (design) of image forming apparatus 1. Information indicating the state estimated by the difference st between the maximum value and the minimum value of the side WAE estimation values as shown in FIG. 13 also needs to be set separately for each machine type of image forming apparatus 1.

In the image forming apparatus 1 including the fuser 200, the center WAE estimation values and the side WAE estimation values can be measured in various states as shown in FIGS. 5 to 10. The information indicating the state (estimated state) corresponding to the difference between the maximum value and the minimum value of the center WAE estimation values and the side WAE estimation values is then set based on the measurement results of the image forming apparatus 1 including the fuser 200. The image forming apparatus 1 including the fuser 200 stores (sets) in the memory the information indicating the state corresponding to the difference between the maximum value and the minimum value of the center WAE estimation values and the side WAE estimation values. As a result, the state prediction process described above can also be performed for the image forming apparatus 1 including the fuser 200.

Next, a fuser 300 will be described as a third example of a fuser that can be applied to the image forming apparatus 1.

Figure 19:
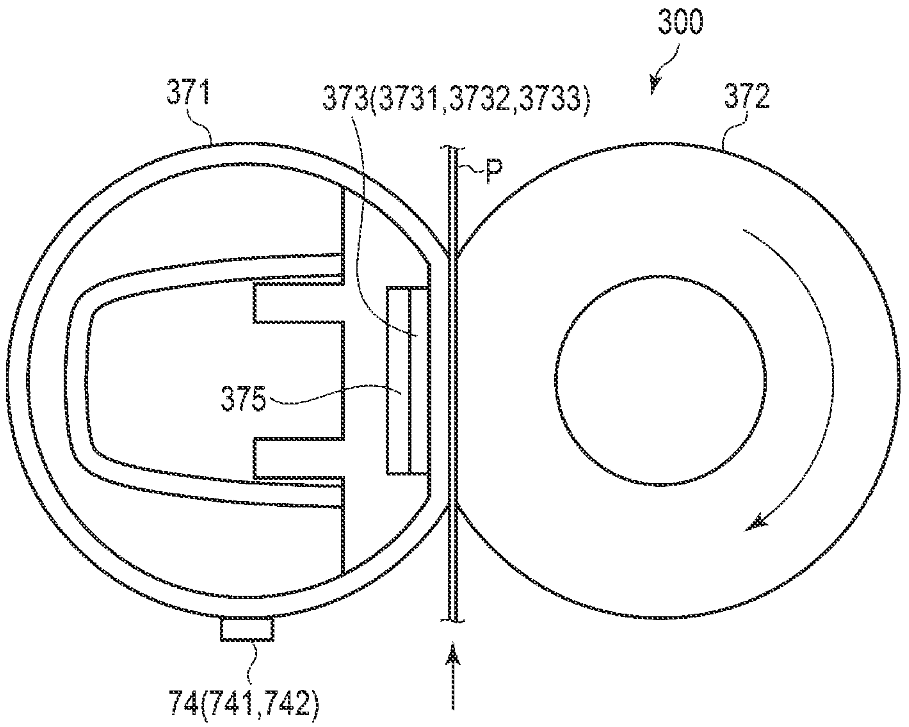
FIG. 19 is a diagram illustrating a third configuration example of a fuser used in a fixing device.
Figure 20:
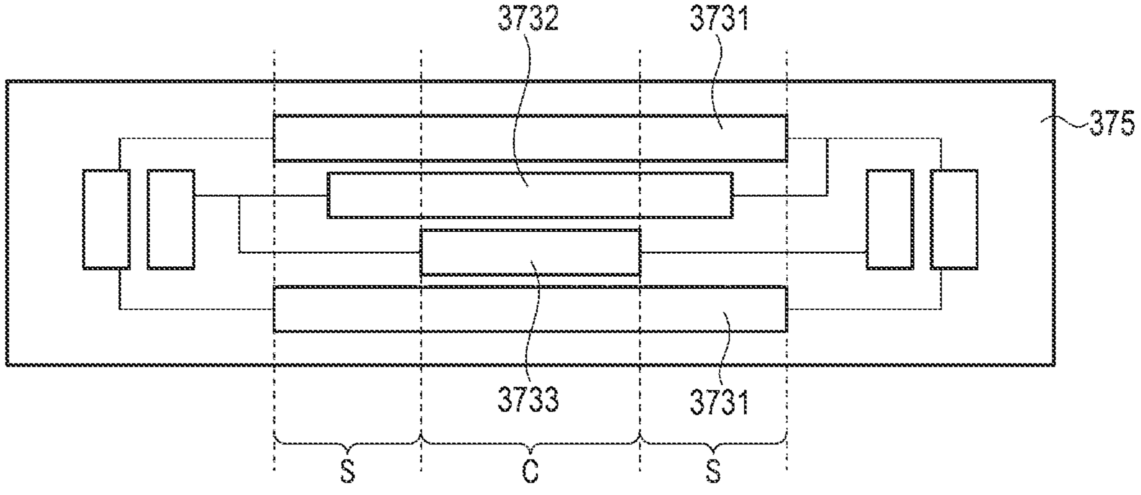
FIG. 20 is a diagram illustrating a configuration example of a heater unit in a fuser of a third configuration example used in a fixing device.

FIG. 19 is a diagram showing a configuration example of the fuser 300. FIG. 20 is a diagram showing a configuration example of a heater unit in the fuser 300.

As shown in FIG. 19, the fuser 300 includes the temperature sensors 74 (741, 742), a tubular film 371 as a fixing member (fixing rotating body), a pressure roller 372, a heating element 373, a heating element substrate 375, and the like. The pressure roller 372 forms a nip between itself and the tubular film 371. The tubular film 371 and the pressure roller 372 press and heat the print medium P entering the nip.

The heater unit includes the heating element 373, the heating element substrate 375, and the like. The heating element substrate 375 can be made of metal material, ceramic material, or the like. The heating element substrate 375 is formed as an elongated rectangular plate shape. The heating element substrate 375 is disposed inside the tubular film 371. The longitudinal direction of the heating element substrate 375 is parallel to the axial direction of the tubular film 271.

The heating element 373 includes a plurality of heating elements 3731, 3732, and 3733. The heating element 373 is provided to be in contact with the inner surface of the tubular film 371 while being disposed on the heating element substrate 375. Each of the heating elements 3731, 3732, and 3733 is a resistor that generates heat when supplied with power from an AC power supply.

The heating elements 3731 are used to fix the toner onto the print medium P having the maximum width (paper width) in the direction orthogonal to the conveying direction. The heating element 3731 has a width corresponding to the maximum printable paper width. A heating element 3731 is disposed on the heating element substrate 375 on the upstream side and the downstream side in the conveying direction of the print medium P.

The heating element 3732 is shorter than the heating element 3731 in the direction orthogonal to the conveying direction of the print medium P. The heating element 3733 is shorter than the heating element 3732 in the direction orthogonal to the conveying direction of the print medium P. The heating element 3731 is a main heater, and the heating elements 3732 and 3733 are sub-heaters. The main heater and the sub-heaters are controlled on and off according to the paper width of the print medium P.

As described above, the WAE control described above is also possible for the fuser 300 shown in FIGS. 19 and 20. Therefore, the image forming apparatus 1 including the fuser 300 shown in FIGS. 19 and 20 can perform the state prediction process using the WAE estimation values as described above. However, the image forming apparatus including the fuser 300 needs to separately set information indicating the state (estimated state) according to the difference between the maximum value and the minimum value of the center WAE estimation values and the side WAE estimation values.

For example, the image forming apparatus 1 including the fuser 300 measures the center WAE estimation values and the side WAE estimation values under various conditions as shown in FIGS. 5 to 10. The image forming apparatus 1 including the fuser 300 stores (sets) in the memory information indicating the state according to the difference between the maximum value and the minimum value of the center WAE estimation values based on the measurement results of various center WAE estimation values. The image forming apparatus 1 including the fuser 300 stores (sets), in the memory, information indicating the state according to the difference between the maximum value and the minimum value of the side WAE estimation values based on the measurement results of various side WAE estimation values. As a result, the state prediction process described above can also be performed for the image forming apparatus 1 including the fuser 300.

Next, a fuser 400 will be described will be described as a fourth example of a fuser that can be applied to the image forming apparatus.

Figure 21:
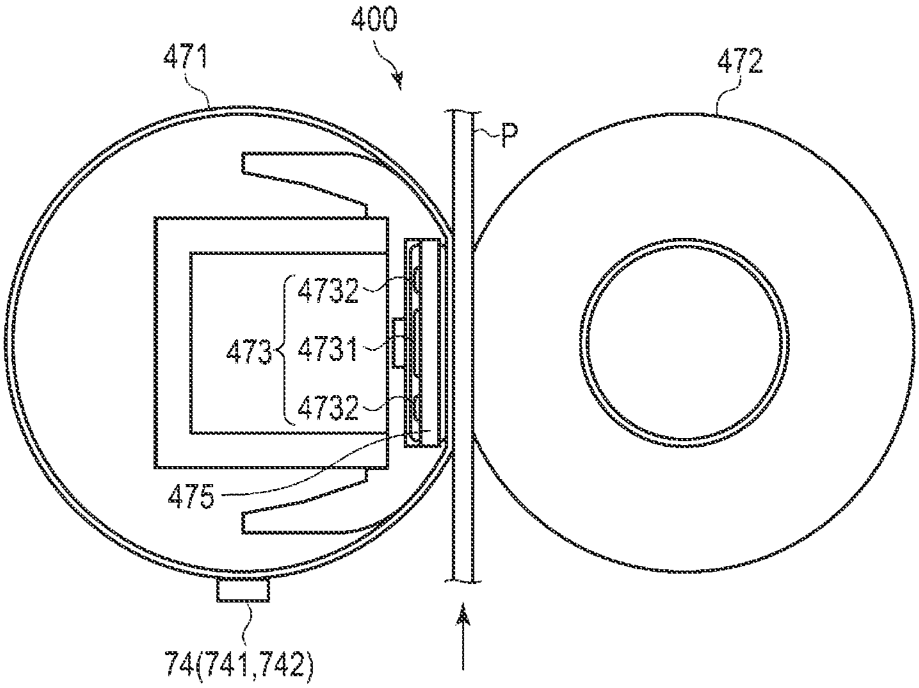
FIG. 21 is a diagram illustrating a fourth configuration example of a fuser used in a fixing device.
Figure 22:
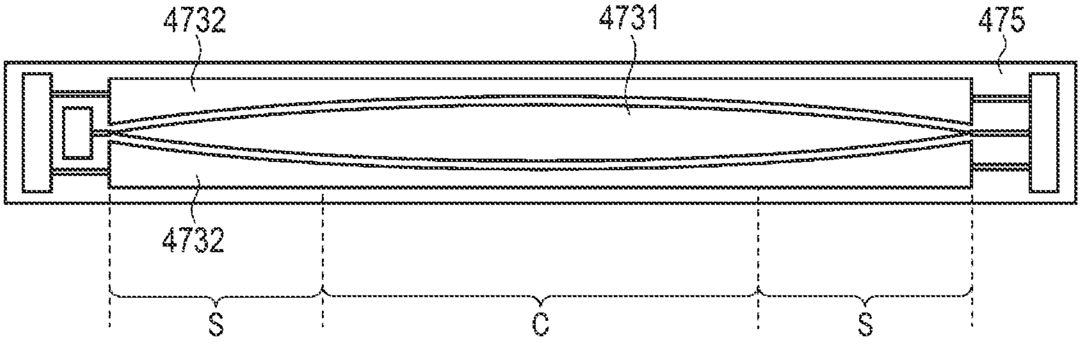
FIG. 22 is a diagram illustrating a configuration example of a heater unit in a fuser of a fourth configuration example used in a fixing device.

FIG. 21 is a diagram showing a configuration example of the fuser 400. FIG. 22 is a diagram showing a configuration example of a heater unit in the fuser 400.

As shown in FIG. 21, the fuser 400 includes the temperature sensors 74 (741, 742), a tubular film 471 as a fixing member (fixing rotating body), a pressure roller 472, a heating element 473, a heating element substrate 475, and the like. The pressure roller 472 forms a nip between itself and the tubular film 471. The tubular film 471 and the pressure roller 472 press and heat the print medium P entering the nip.

The heater unit includes the heating element 473, the heating element substrate 475, and the like. The heating element substrate 475 can be made of metal material, ceramic material, or the like. The heating element substrate 475 is formed as an elongated rectangular plate shape. The heating element substrate 475 is disposed inside the tubular film 471. The longitudinal direction of the heating element substrate 475 is parallel to the axial direction of the tubular film 471.

The heating element 473 includes heating elements 4731 and 4732. The heating element 473 is provided to be in contact with the inner surface of the tubular film 471 while being disposed on the heating element substrate 475. For example, each of the heating elements 4731 and 4732 is a resistor that generates heat when supplied with power from an AC power supply.

A width of the heating element 4731 corresponds to the maximum width of a print medium P in the direction perpendicular to the conveying direction. As shown in FIG. 22, the heating element 4731 has a large width in the conveying direction at the central portion in the direction perpendicular to the conveying direction, and a small width in the conveying direction at the end portions. The heating element 4731 is a main heater configured to heat the center region C intensively. The heating elements 4732 have a small width in the conveying direction at the central portion and a larger width at the end portions. The heating element 4732 is a sub-heater configured to heat the side region S intensively. The main heater and the sub-heaters are controlled on and off according to the paper width of the print medium P.

As described above, the WAE control described above is also possible for the fuser 400 shown in FIGS. 21 and 22. Therefore, the image forming apparatus 1 including the fuser 400 shown in FIGS. 21 and 22 can perform the state prediction process using the WAE estimation value as described above. However, the image forming apparatus 1 including the fuser 400 needs to separately set information indicating the state (estimated state) according to the difference between the maximum value and the minimum value of the center WAE estimation values and the side WAE estimation values.

The image forming apparatus 1 including the fuser 400 measures the center WAE estimation values and the side WAE estimation values under various conditions as shown in FIGS. 5 to 10. The image forming apparatus including the fuser 400 stores (sets) in the memory, information indicating a state according to the difference between the maximum value and the minimum value of the center WAE estimation values based on the measurement results of various center WAE estimation values. The image forming apparatus 1 including the fuser 400 stores (sets) in the memory information indicating the state according to the difference between the maximum value and the minimum value of the side WAE estimation values based on the measurement results of various side WAE estimation values. As a result, the state prediction process described above can also be performed for the image forming apparatus 1 including the fuser 400.

Next, a fuser 500 will be described will be described as a fifth example of a fuser that can be applied to the image forming apparatus.

Figure 23:
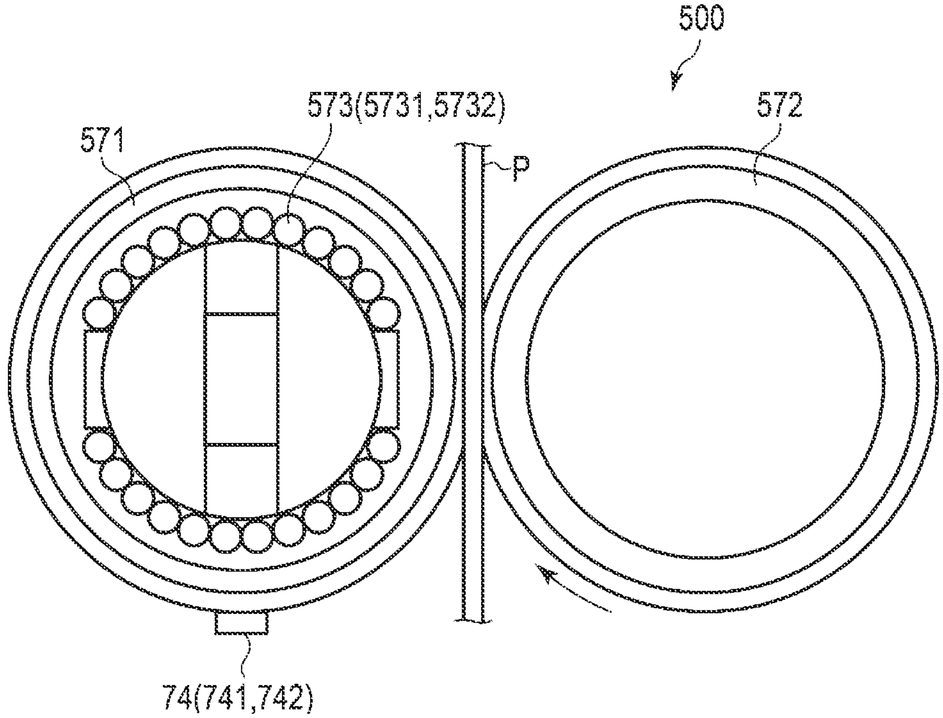
FIG. 23 is a diagram illustrating a fifth configuration example of a fuser used in a fixing device.
Figure 24:
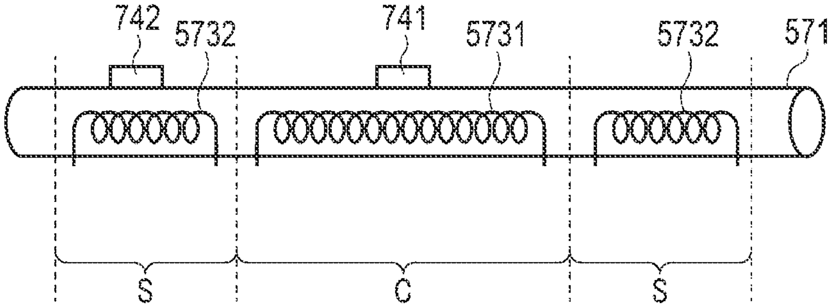
FIG. 24 is a diagram illustrating a configuration example of a heater unit in a fuser of a fifth configuration example used in a fixing device.

FIG. 23 is a diagram showing a configuration example of the fuser 500. FIG. 24 is a diagram showing a configuration example of a heater unit in the fuser 500.

As shown in FIG. 23, the fuser 500 includes the temperature sensors 74 (741, 742), a heat roller 571 as a fixing member, a pressure roller 572, an induction heating coil 573, and the like. The pressure roller 572 forms a nip between itself and the heat roller 571. The heat roller 571 and the pressure roller 572 press and heat the print medium P entering the nip.

The induction heating coil 573 is an example of a heat source that heats the heat roller 571. The induction heating coil 573 includes a central coil 5731 and end coils 5732. The central coil 5731 and the end coils 5732 are arranged side by side inside the heat roller 571 in a direction (rotation axis direction of the heat roller 571) orthogonal to the sheet conveying direction. The central coil 5731 is disposed to be aligned with the central position of the print medium P passing through the nip in the width direction. The end coils 5732 are arranged side by side on both sides (ends) of the central coil 5731.

The central coil 5731 is an example of the first heat source. As shown in FIG. 24, the central coil 5731 heats the center region C of the heat roller 571. The end coils 5732 are examples of the second heat source. As shown in FIG. 24, the end coils 5732 heat the side region S of the heat roller 571.

The temperature sensors 741 and 742 are contact-type temperature sensing devices such as thermistors, like the fuser 21 of the first configuration example. The temperature sensor 741 senses the temperature of the center region C of the heat roller 571. The temperature sensor 742 senses the temperature of the side region S of the heat roller 571.

The WAE control described above is also possible for the fuser 500 shown in FIGS. 23 and 24. Therefore, in the image forming apparatus 1 including the fuser 500 shown in FIGS. 23 and 24, the state prediction process using the WAE estimation values as described above can be performed. However, the image forming apparatus 1 including the fuser 500 needs to separately set information indicating the state (estimated state) according to the difference between the maximum value and the minimum value of the center WAE estimation values and the side WAE estimation values.

For example, the image forming apparatus 1 including the fuser 500 measures the center WAE estimation values and the side WAE estimation values under various conditions as shown in FIGS. 5 to 10. The image forming apparatus including the fuser 500 stores (sets) in the memory information indicating the state according to the difference between the maximum value and the minimum value of the center WAE estimation values based on the measurement results of various center WAE estimation values. The image forming apparatus including the fuser 500 stores (sets) in the memory information indicating the state according to the difference between the maximum value and the minimum value of the side WAE estimation values based on the measurement results of various side WAE estimation values. As a result, the state prediction process described above can also be performed for the image forming apparatus 1 including the fuser 500.

Note that certain functions described as being implanted by a controller element, processor, or the like in each of the embodiments described above executing software instructions or the like can also or instead be implemented using only hardware such as by use of dedicated hardware circuits, programmable arrays, and/or the like. Similarly, each described function may be implemented as combinations of software and hardware as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing device, comprising:

a fuser including a fixing member with a surface to contact a printable medium and a heat source for heating the fixing member;

a first temperature sensor with a first sensing part that contacts a first region of the surface of the fixing member;

a second temperature sensor with a second sensing part that contacts a second region of the surface of the fixing member;

a memory;

a heater control circuit configured to generate, over a time period, first estimation values of temperatures for the first region based on outputs from the first temperature sensor and second estimation values of temperatures for the second region based on outputs from the second temperature sensor, and store the generated first and second estimation values in the memory; and a controller configured to determine whether there is an abnormality in the fixing device based on a difference between a maximum value and a minimum value of the first estimation values stored in the memory or a difference between a maximum value and a minimum value of the second estimation values stored in the memory.

2. The fixing device according to claim 1, wherein the controller is configured to determine whether there is an abnormality in the first temperature sensor based on the difference between the maximum value and the minimum value of the first estimation values stored in the memory and whether there is an abnormality in the second temperature sensor based on the difference between the maximum value and the minimum value of the second estimation values stored in the memory.

3. The fixing device according to claim 2, wherein the heat source includes a first heating component that heats the first region and a second heating component that heats the second region, and the controller is configured to determine whether there is a variation in input power input to the first heating component based on the difference between the maximum value and the minimum value of the first estimation values stored in the memory and identify whether there is a variation in input power input to the second heating component based on the difference between the maximum value and the minimum value of the second estimation values stored in the memory.

4. The fixing device according to claim 2, wherein the controller is configured to determine a temperature rise value for the first region relative to a temperature sensed by the first temperature sensor based on the difference between the maximum value and the minimum value of the first estimation values stored in the memory and determine a temperature rise value for the second region relative to a temperature sensed by the second temperature sensor based on the difference between the maximum value and the minimum value of the second estimation values stored in the memory.

5. The fixing device according to claim 1, wherein the controller is configured to output an abnormality determination result to an external device.

6. The fixing device according to claim 1, wherein the heat source is a halogen lamp.

7. The fixing device according to claim 1, wherein the heat source is a plurality of resistance heating elements.

8. An image forming apparatus, comprising:

an image forming unit configured to form a toner image on a printable medium;

a fuser configured to receive the printable medium from the image forming unit and fix the toner image to the printable medium, the fuser including:

a fixing member with a surface to contact the printable medium and a heat source for heating the fixing member, a first temperature sensor with a first sensing part that contacts a first region of the surface of the fixing member, a second temperature sensor with a second sensing part that contacts a second region of the surface of the fixing member, a memory, and a heater control circuit configured to generate, over a time period, first estimation values of temperatures for the first region based on outputs from the first temperature sensor and second estimation values of temperatures for the second region based on outputs from the second temperature sensor, and store the generated first and second estimation values in the memory; and a controller configured to determine whether there is an abnormality based on a difference between a maximum value and a minimum value of the first estimation values stored in the memory or a difference between a maximum value and a minimum value of the second estimation values stored in the memory.

9. The image forming apparatus according to claim 8, wherein the controller is configured to determine whether there is an abnormality in the first temperature sensor based on the difference between the maximum value and the minimum value of the first estimation values stored in the memory and whether there is an abnormality in the second temperature sensor based on the difference between the maximum value and the minimum value of the second estimation values stored in the memory.

10. The image forming apparatus according to claim 9, wherein the heat source includes a first heating component that heats the first region and a second heating component that heats the second region, and the controller is configured to determine whether there is a variation in input power input to the first heating component based on the difference between the maximum value and the minimum value of the first estimation values stored in the memory and identify whether there is a variation in input power input to the second heating component based on the difference between the maximum value and the minimum value of the second estimation values stored in the memory.

* * * * *